(12) United States Patent
McBride et al.

(10) Patent No.: US 8,204,955 B2
(45) Date of Patent: Jun. 19, 2012

(54) METHOD AND SYSTEM FOR ANALYZING MULTIMEDIA CONTENT

(75) Inventors: Kurtis McBride, Kitchener (CA); Chris Fairles, Mount Forest (CA); Kevin Madill, Kanata (CA); Di Zhang, Waterloo (CA); Tony Brijpaul, Mississauga (CA); David Thompson, Waterloo (CA); Vecheslav Silagadze, Richmond Hill (CA)

(73) Assignee: Miovision Technologies Incorporated, Kitchener (CA)

( * ) Notice: Subject to any disclaimer, the term of this patent is extended or adjusted under 35 U.S.C. 154(b) by 353 days.

(21) Appl. No.: 12/104,092

(22) Filed: Apr. 16, 2008

(65) Prior Publication Data

US 2008/0270569 A1    Oct. 30, 2008

Related U.S. Application Data

(60) Provisional application No. 60/913,854, filed on Apr. 25, 2007.

(51) Int. Cl.
*G06F 15/16* (2006.01)

(52) U.S. Cl. ........ 709/217; 709/220; 709/223; 709/203; 709/227

(58) Field of Classification Search .................. 709/217, 709/220, 223, 203, 227
See application file for complete search history.

(56) References Cited

U.S. PATENT DOCUMENTS

| | | | |
|---|---|---|---|
| 5,821,945 A | 10/1998 | Yeo et al. | |
| 5,822,542 A | 10/1998 | Smith et al. | |
| 5,875,305 A | 2/1999 | Winter et al. | |
| 5,918,223 A | 6/1999 | Blum et al. | |
| 5,974,235 A | 10/1999 | Nunally et al. | |
| 6,011,895 A | 1/2000 | Abecassis | |
| 6,097,429 A | 8/2000 | Seeley et al. | |
| 6,113,645 A * | 9/2000 | Benitz et al. | 703/22 |
| 6,414,960 B1 * | 7/2002 | Kuhn et al. | 370/395.64 |
| 6,735,253 B1 | 5/2004 | Chang et al. | |
| 6,751,776 B1 | 6/2004 | Gong | |
| 6,819,924 B1 * | 11/2004 | Ma et al. | 455/425 |
| 6,877,134 B1 | 4/2005 | Fuller et al. | |
| 6,940,998 B2 | 9/2005 | Garoutte | |

(Continued)

FOREIGN PATENT DOCUMENTS

CA    2472390 A1    7/2003

(Continued)

OTHER PUBLICATIONS

Valera, M. et al.; "Intelligent distributed surveillance systems: a review"; IEEE Proceedings—Vis. Image Signal Process; Apr. 2, 2005; pp. 192 to 204; vol. 152, No. 2; IEEE; ISSN: 0956-375X.

(Continued)

*Primary Examiner* — Lan-Dai T Truong
(74) *Attorney, Agent, or Firm* — Brett J. Slaney; Blake, Cassels & Graydon LLP

(57) ABSTRACT

A method and system are provided for remotely analyzing multimedia content, in particular video, and extracting information from such multimedia content. The system analyses, e.g. a video file by way of an FTP, file upload or streaming data etc., and configuration settings specified in one embodiment by a separate entity at one of multiple server entities. The system also comprises one or more remote server entities utilizing data storage and data processing capabilities. In one embodiment the client sends a video source and configuration settings over a network, the remote server accepts the video source, generates configuration settings, and a data processing module analyzes the video content to extract data from the video.

20 Claims, 19 Drawing Sheets

U.S. PATENT DOCUMENTS

| | | | |
|---|---|---|---|
| 6,968,302 | B1 | 11/2005 | Ahrens et al. |
| 7,028,325 | B1 | 4/2006 | Rui et al. |
| 7,046,914 | B2 | 5/2006 | Jasinschi et al. |
| 7,580,547 | B2 | 8/2009 | Benhammou |
| 7,885,760 | B2 * | 2/2011 | Sutardja ............... 701/117 |
| 2002/0004816 | A1 * | 1/2002 | Vange et al. .............. 709/202 |
| 2002/0091764 | A1 | 7/2002 | Yale |
| 2003/0033318 | A1 | 2/2003 | Carlbom et al. |
| 2003/0053536 | A1 | 3/2003 | Ebrami |
| 2003/0105589 | A1 | 6/2003 | Liu et al. |
| 2003/0185296 | A1 | 10/2003 | Masten, Jr. |
| 2004/0010483 | A1 | 1/2004 | Brands et al. |
| 2004/0125148 | A1 | 7/2004 | Pea et al. |
| 2004/0168205 | A1 | 8/2004 | Nesvadba et al. |
| 2004/0252646 | A1 * | 12/2004 | Adhikari et al. ............ 370/252 |
| 2005/0033760 | A1 | 2/2005 | Fuller et al. |
| 2005/0151846 | A1 | 7/2005 | Thornhill |
| 2005/0238238 | A1 | 10/2005 | Xu et al. |
| 2005/0265582 | A1 | 12/2005 | Buehler et al. |
| 2006/0029007 | A1 * | 2/2006 | Ayyagari ............... 370/310 |
| 2006/0029067 | A1 * | 2/2006 | Conway ............... 370/389 |
| 2006/0059530 | A1 * | 3/2006 | Spielman et al. ............ 725/132 |
| 2006/0078047 | A1 | 4/2006 | Shu et al. |
| 2006/0227997 | A1 | 10/2006 | Au et al. |
| 2006/0259629 | A1 * | 11/2006 | Usmani et al. ............ 709/227 |
| 2007/0002141 | A1 | 1/2007 | Lipton et al. |
| 2007/0041447 | A1 | 2/2007 | Burazerovic et al. |
| 2007/0053313 | A1 | 3/2007 | Adams et al. |
| 2007/0053513 | A1 | 3/2007 | Hoffberg |
| 2007/0083553 | A1 | 4/2007 | Minor |
| 2007/0157274 | A1 * | 7/2007 | Chiu ............... 725/107 |
| 2008/0166018 | A1 | 7/2008 | Li et al. |
| 2008/0263402 | A1 * | 10/2008 | Braysy ............... 714/32 |
| 2011/0137545 | A1 * | 6/2011 | Downs et al. ............ 701/119 |

FOREIGN PATENT DOCUMENTS

| | | | |
|---|---|---|---|
| CA | 2522923 | A1 | 11/2004 |
| CA | 2538294 | A1 | 3/2005 |
| CA | 2601832 | A1 | 8/2007 |
| CN | 1476250 | A | 2/2004 |
| CN | 1558679 | A | 12/2004 |
| CN | 1767662 | A | 5/2006 |
| CN | 1773911 | A | 5/2006 |
| CN | 1922610 | A | 2/2007 |
| CN | 1977262 | A | 6/2007 |
| EP | 0604009 | A1 | 6/1994 |
| EP | 0823821 | A2 | 2/1998 |
| EP | 0815688 | B1 | 5/2000 |
| EP | 1229547 | A2 | 8/2002 |
| EP | 1328126 | A1 | 7/2003 |
| EP | 1453312 | A2 | 9/2004 |
| EP | 1463325 | A2 | 9/2004 |
| EP | 1471738 | A2 | 9/2004 |
| EP | 1616275 | A1 | 10/2004 |
| EP | 1669273 | A2 | 6/2006 |
| EP | 1764712 | A1 | 3/2007 |
| JP | 9288684 | A2 | 11/1997 |
| JP | 2003256955 | A2 | 9/2003 |
| JP | 2004097783 | A2 | 4/2004 |
| KR | 20040054266 | A | 6/2004 |
| KR | 20040106193 | A | 12/2004 |
| KR | 20050122265 | A | 12/2005 |
| TW | 200915240 | A | 4/2009 |
| WO | WO 98/19450 | A2 | 5/1998 |
| WO | WO 98/21688 | A1 | 5/1998 |
| WO | WO 02/089008 | A2 | 11/2002 |
| WO | WO 03/083726 | A1 | 10/2003 |
| WO | WO 2004/043029 | A2 | 5/2004 |
| WO | WO 2004/086014 | A1 | 10/2004 |
| WO | WO 2004/100162 | A2 | 11/2004 |
| WO | WO 2005/031561 | A1 | 4/2005 |
| WO | WO 2006/039190 | A2 | 4/2006 |
| WO | WO 2006/114353 | A1 | 11/2006 |

OTHER PUBLICATIONS

Wang, C-H. et al.: "An Effective Communication Model for Collaborative Commerce of Web-Based Surveillance Services"; Proceedings of the IEEE International Conference on E-Commerce (CEC'03); Jun. 2003; pp. 40 to 44; Computer Society; ISBN: 978-0-7695-1969-2.

Barnardi, L.; Supplementary Search Report from corresponding European Application No. 08733750.7; search completed Oct. 6, 2011.

Kaewtrakulpong P and Bowden, R.; "An Improved Adaptive Background Mixture Model for Realtime Tracking with Shadow Detection"; Proceedings of $2^{nd}$ European Workshop on Advanced Video Based Surveillance Systems; Sep. 2001; pp. 1 to 5; Kluwer Academic Publishers.

Cartile, T.; International Search Report from corresponding PCT Application No. PCT/CA2008/000699.

* cited by examiner

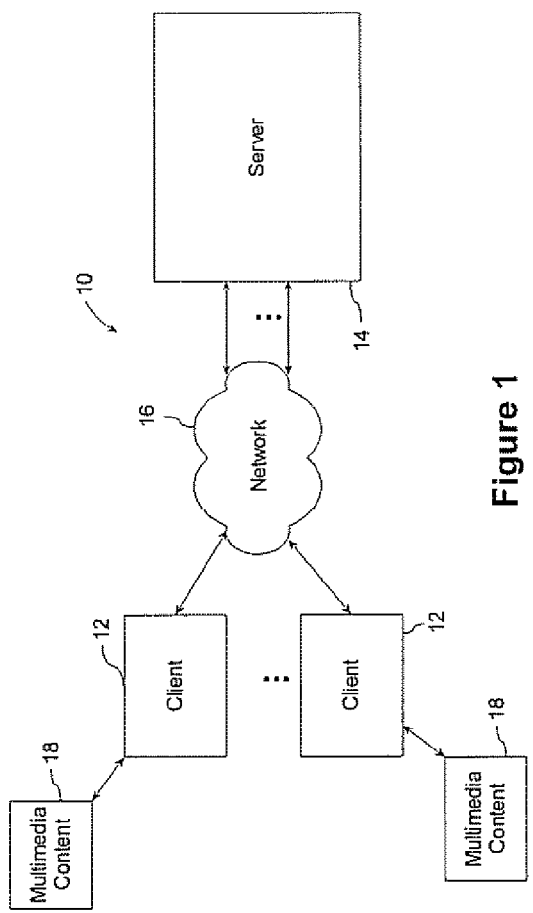
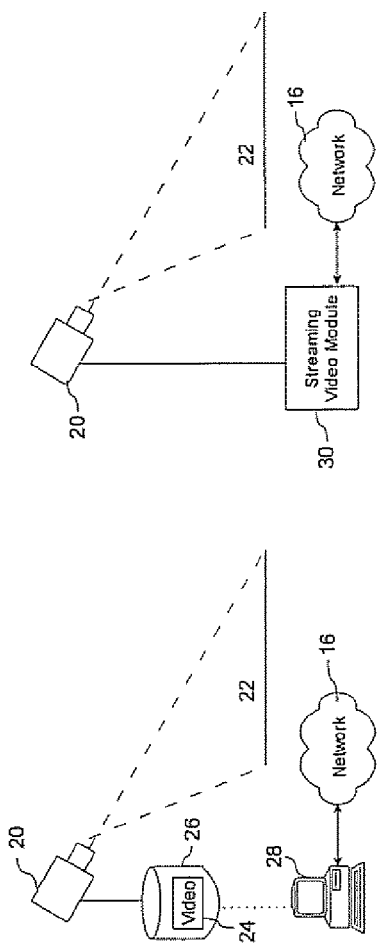

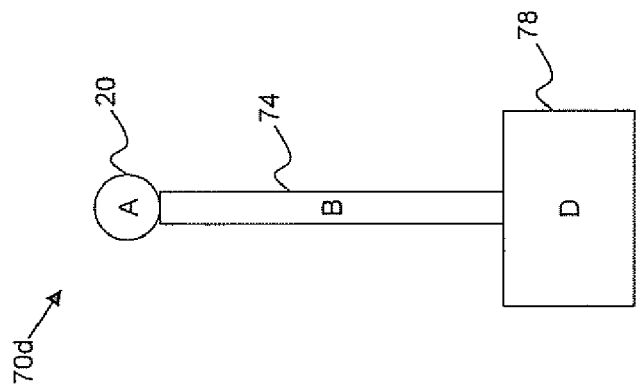
Figure 5(d)
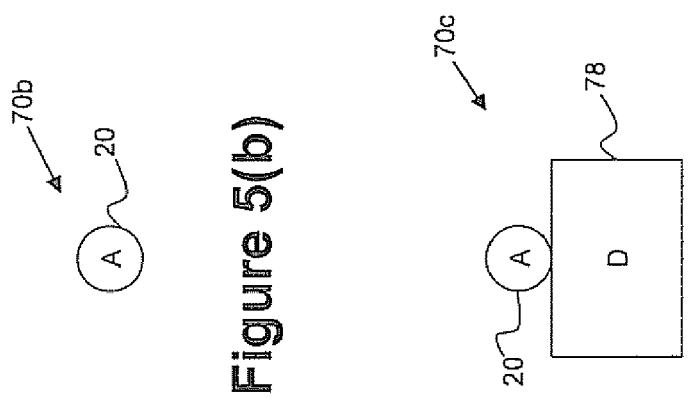
Figure 5(b)
Figure 5(c)
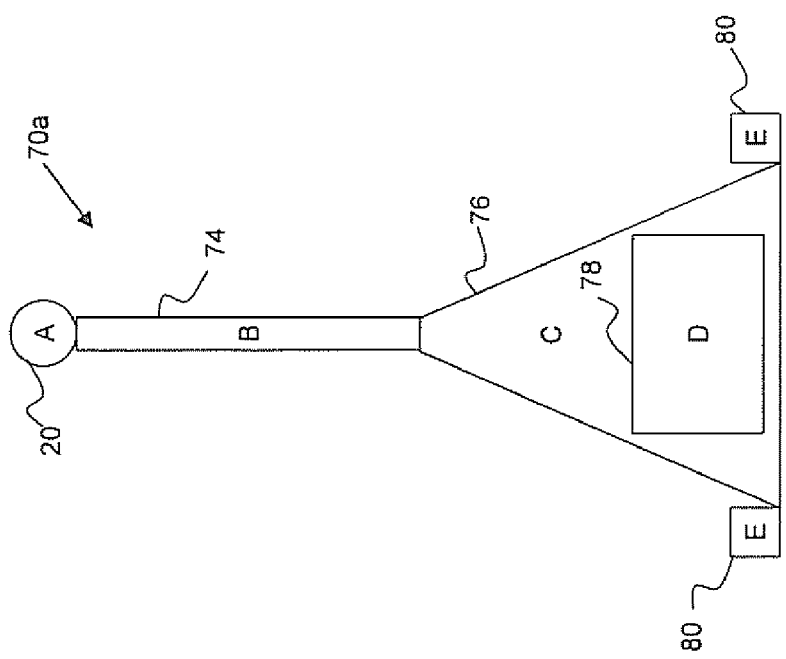
Figure 5(a)

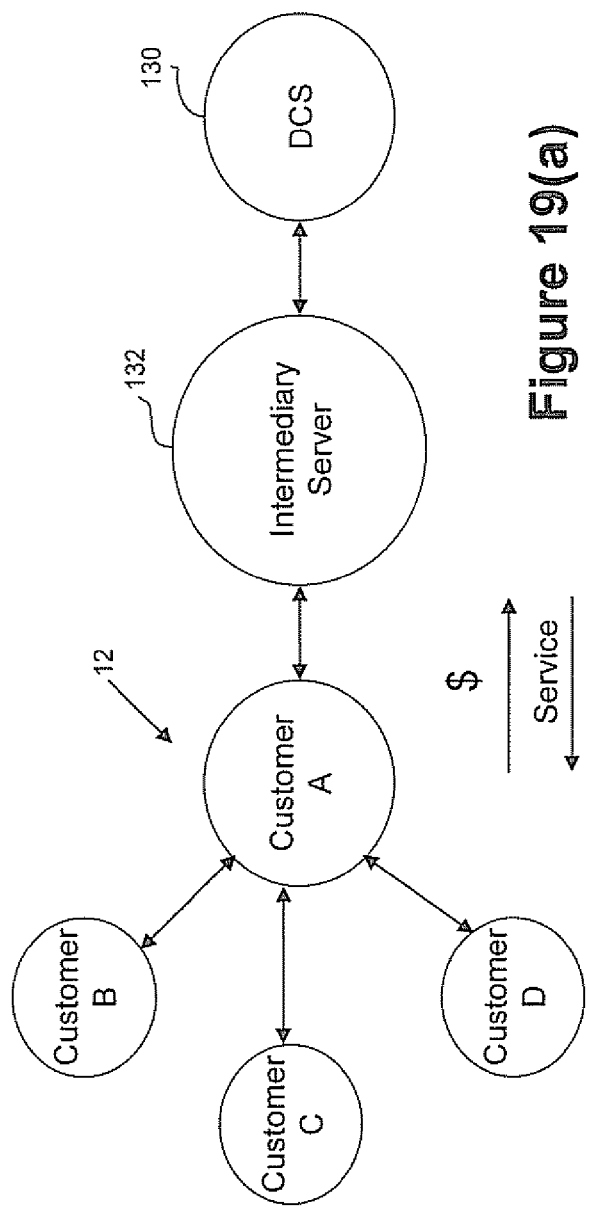
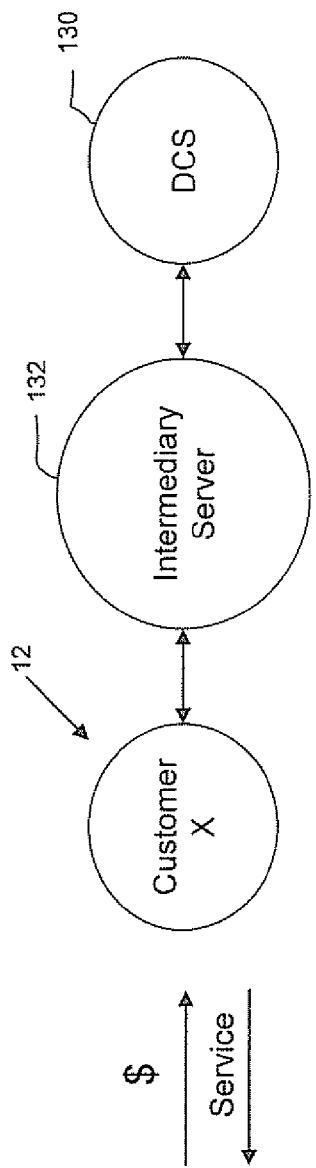
Figure 19(a)
Figure 19(b)

METHOD AND SYSTEM FOR ANALYZING MULTIMEDIA CONTENT

This application claims priority from U.S. Application No. 60/913,854 filed on Apr. 25, 2007, the contents of which are incorporated herein by reference.

FIELD OF THE INVENTION

The invention relates to the analysis of multimedia content and has particular utility in analyzing video content.

BACKGROUND

In industries such as transportation and retail, video analysis is often performed using permanent, dedicated systems, e.g. to capture vehicular or pedestrian traffic. In such dedicated systems, video content is captured and stored as one or more video files for analysis or analysed at the source using smart cameras. Ad-hoc solutions also exist, where temporary monitoring stations are put in place to capture the video content. In such ad-hoc solutions video files are captured and stored and then later viewed by personnel who record the data manually. In general, video content or a "video" may refer to any data associated with a sequence of still images or frames representing a scene and a video file may refer to any data structure used to capture, record, store, copy, display, transmit, modify or otherwise process or handle such video content.

A problem with dedicated systems is that many organizations do not need to analyse video content on an ongoing basis and thus having dedicated equipment and personnel is prohibitive. For example, when collecting data for an intersection, one may only be interested in peak times and need to gather this data on a periodic basis such as monthly, quarterly or yearly. Similarly, in retail applications, knowledge of overall customer traffic patterns may only be needed on a monthly, quarterly or yearly basis or when floor layouts change etc. Customer line ups may also only be a concern at peak times. Ad-hoc solutions which can be an improvement over dedicated systems because of their flexibility also pose problems because viewing and recording data manually is labour intensive.

In other applications, video surveillance and video analysis are used for reasons such as security concerns, the desire to deter crime and otherwise unwanted behaviour, and the desire to monitor and control an environment among others. Due to the availability of less expensive and more sophisticated equipment, the use of video surveillance and video analysis techniques have become increasingly widespread in many industries. In some cases, complex networks of cameras are being used to monitor large areas such as department stores, traffic zones and entire cities.

Although devices such as smart cameras and the availability of relatively inexpensive data storage make obtaining video content increasingly more attractive, as more and more cameras are added and more and more content is acquired, the processing requirements can become difficult to manage. In many cases, dedicated processing equipment and dedicated personnel are required to perform the necessary processing, which for small organizations can make the adoption of any video analysis step prohibitive. Similar problems can arise in analysing other types of media such as audio and still image photography.

It is therefore an object of the following to obviate or mitigate the above-noted disadvantages.

SUMMARY

In one aspect, there is provided a method for analysing multimedia content comprising: obtaining the multimedia content from one or more remote client devices; generating a set of configuration settings for the multimedia content indicative of how the multimedia content should be analyzed according to the nature of the multimedia content; analyzing the multimedia content according to the configuration settings to extract data therefrom indicative of characteristics of the multimedia content; and making the extracted data available to a corresponding one of the remote client devices.

In another aspect, a computer readable medium comprising computer executable instructions is provided that when executed, performs the method described above.

In yet another aspect, there is provided a system for analyzing multimedia content comprising at least one server entity connected to one or more remote client devices over a network, the at least one server entity being configured for obtaining the multimedia content from the one or more remote client devices; generating a set of configuration settings for the multimedia content indicative of how the multimedia content should be analyzed according to the nature of the multimedia content; analyzing the multimedia content according to the configuration settings to extract data therefrom indicative of characteristics of the multimedia content; and making the extracted data available to a corresponding one of the remote client devices.

BRIEF DESCRIPTION OF THE DRAWINGS

Embodiments will now be described by way of example only with reference to the appended drawings wherein:

FIG. 1 is schematic diagram of a system for analyzing multimedia content.

FIG. 2(a) is a schematic diagram showing one arrangement for obtaining video content.

FIG. 2(b) is a schematic diagram showing another arrangement for obtaining video content.

FIGS. 5(a) to 5(d) are schematic block diagrams showing various configurations for collecting video.

FIGS. 19(a) to 19(c) show various customer relationships for having, the video analysis performed.

DETAILED DESCRIPTION OF THE DRAWINGS

Figure 3:
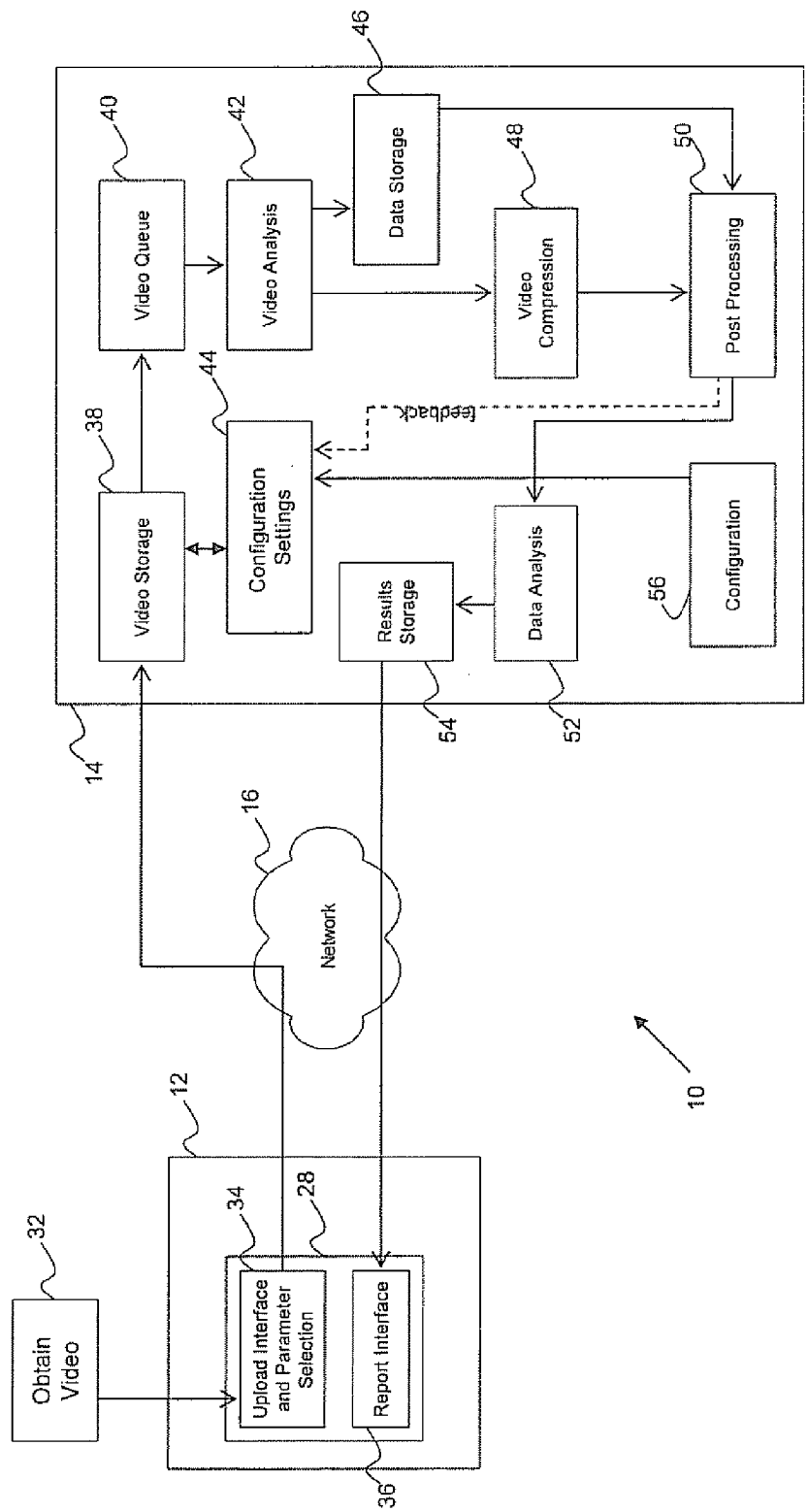
FIG. 3 is a schematic block diagram showing data flow using an upload configuration.

The following provides a method and system for remotely analyzing multimedia content, in particular video content, and extracting information from such multimedia content. The system analyses, e.g. a video file, FTP, file upload or streaming data, and parameter settings provided by a client (e.g. web-based Linux, Windows Unix. Solaris, Mac etc.). The system may also utilize a computer accessible network (e.g. Internet, TCP/IP protocol, UDP protocol etc.), and one or more remote server entities having data storage and data processing capabilities.

The client can send video content and parameters associated with the video content over the network to a storage node at the server side and configuration and analysis of the video content may then be performed thus offloading processing intensive operations from the client side to the server side. Information pertaining to the analysis is typically stored in a data storage module and can be accessed by the client via the network. The client can either include a user interface for uploading the content, or can comprise a module for streaming content automatically.

The server can also analyze the video content from multiple clients simultaneously and can store the video content in data storage in a sequence that can be subsequently analyzed.

The method and system described herein move the analytical processing and configuration of the content away from the multimedia device that obtains the content and onto one or more remote server entities or devices that work together to configure the multimedia content, analyze the content, refine the results and report back to the client device. This avoids the need for specialized and/or dedicated devices and software required to perform the analyses and can eliminate/offload labour intensive analysis steps from the client side. As will be discussed in greater detail below, the content can be either captured and uploaded or streamed directly to a centralized location. This offers an inexpensive, scalable and more flexible solution since the user can link into the system whenever required rather than having such dedicated equipment.

Referring now to FIG. 1, a remote multimedia analysis system is generally denoted by numeral 10. The system 10 comprises one or more clients 12 connected to a remote server 14 through a network 16. The clients 12 may reside in any electronic device capable of connecting to the network 16, such as a personal computer (PC), laptop, mobile device, smart camera, custom computing module etc. The clients 12 obtain multimedia content (e.g. video) from a multimedia device such as a video camera 20 (see also FIG. 2). The network 16 is typically a wide area network, either landline or wireless e.g. the Internet, but may also be a local area network or Intranet, e.g., in an internal system.

The server 14 may comprise one or more server entities or devices that may themselves be remote from each other to thereby divide and distribute the analysis operations and tasks amongst different entities to optimize throughput and accommodate many clients 12. In one embodiment, a distributed computing system (DCS) 130 (see FIG. 11) is used which may comprise one or more server computers but is preferably also scalable such that many server computers can be used and thus capacity can be expanded when needed. The DCS 130 as will be discussed in greater detail below generally comprises storage and processing nodes. In this way, the DCS 130 can be employed to divide computing tasks for increased throughput and efficiency. In another embodiment, multiple "centralized" computing centres can be used such that processing can be performed at more than one physical location when scaling. In such an embodiment, communication with the computing centres can be handled in such a way that they appear to be "centralized" when they are in fact in different physical locations, i.e. as a distributed system. Also, a single computing centre using cluster computing internally can be used or the multiple centres to appear as a single centralized site. It can therefore be appreciated that the server 14 can be implemented in any configuration that is suitable for the processing requirements and business requirements for implementing the system. For example, all functions and responsibilities can even be performed by a single server device if the application permits.

Turning now to FIG. 2(a), one configuration for obtaining video content is shown. A video camera 20 observing/monitoring an area 22 captures video content and generates a video file 24 which is stored in a data storage device 26. It will be appreciated that the data storage device 26 and video files 24 may be internal to the camera 20 or be transmitted to a remote storage (not shown in FIG. 2(a)). The stored video files 24 are uploaded or downloaded over the network 16 or may be transferred physically, e.g. by way of a DVD, portable memory etc.

In another example, shown in FIG. 2(b), the video content is acquired and streamed directly to the server 14 over the network 16 via a streaming video module 30. In this example, user interaction can be minimized or even eliminated. It can therefore be appreciated that multimedia content 18 may be obtained and transferred to the server 14 using any suitable configuration that best suits the particular application.

For example, in traffic monitoring, the arrangement shown in FIG. 2(a) may be appropriate as video cameras can be deployed for specific monitoring periods or studies (i.e. do not need to be permanent installations) and video stored and uploaded at the end of the study. Also, the arrangement shown in FIG. 2(a) may be suitable where video or other multimedia content can be edited prior to being uploaded to minimize the time and cost of performing the analysis.

In another example, the arrangement shown in FIG. 2(b) may be suitable for retail, amusement parks, or casinos to name a few, where dedicated video infrastructure already exists and the streaming module 30 can be added to direct the content to the server 14 for subsequent analysis, e.g. for security applications. This enables a client 12 to add to existing equipment without requiring further dedicated security/analysis staff. Moreover, the streaming module 30 can be provided as an off-the-shelf unit with maintenance and warranty options to further displace responsibility from the client side to the server side. It can be appreciated that the arrangement shown in FIG. 2(b) is also suitable for monitoring traffic, especially where permanent cameras are in place for regular traffic news etc.

FIG. 3 provides an overview of the data flow from the client side to the server side for the arrangement shown in FIG. 2(a). Although the following examples are provided in the context of video content and video analysis, it will be appreciated that the principles equally apply to other multimedia content and multimedia analysis as discussed above.

Figure 4:
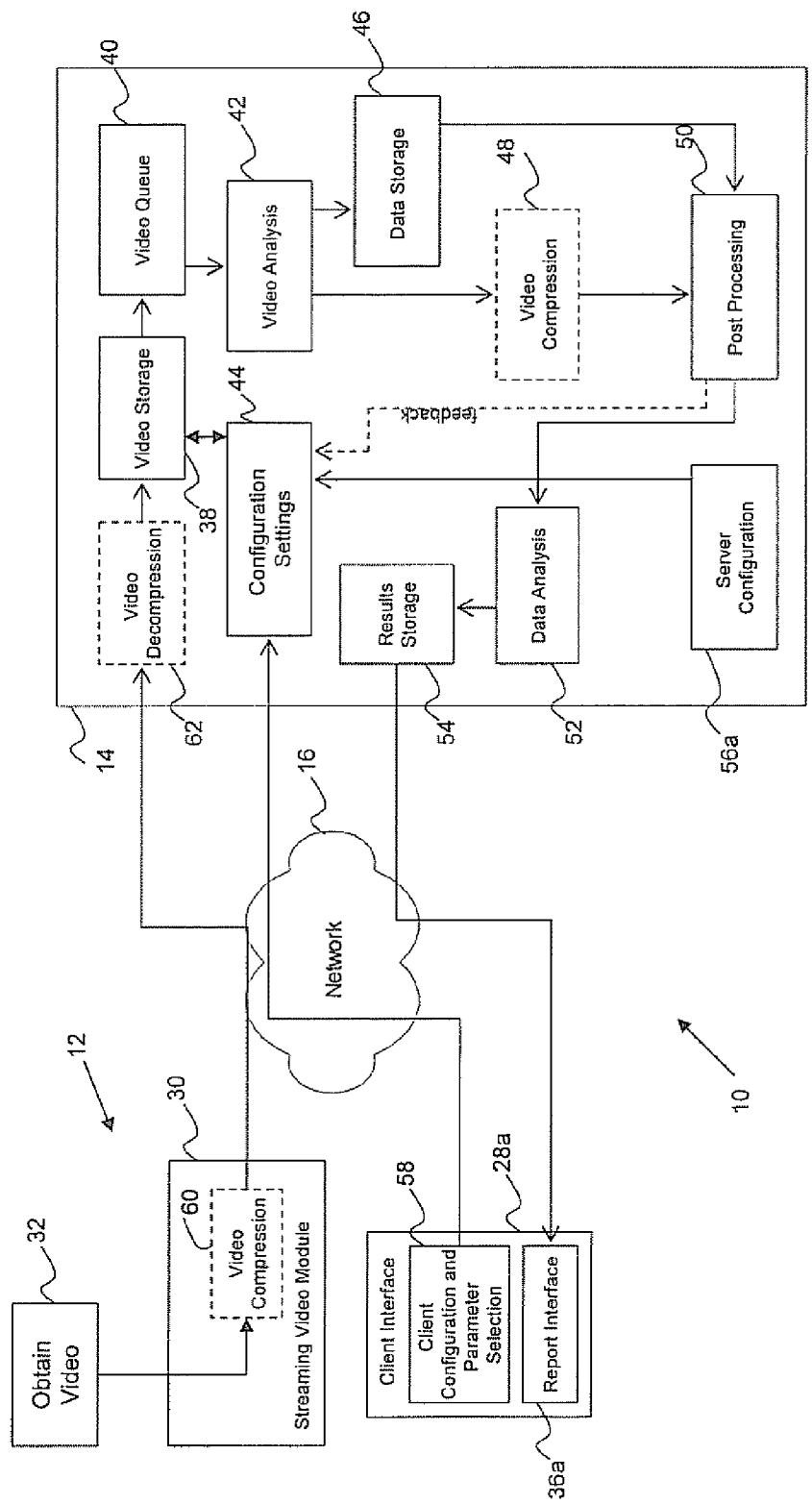
FIG. 4 is a schematic block diagram showing data flow using a streaming configuration.

In stage 32, video content, e.g. a video file 24, is obtained by a camera or other imaging device. This can be effected by loading a file 24 into PC 28, downloading a file 24 from storage 26 etc. In the example shown in FIG. 3, a user upload interface 34 is provided by the PC 28. The upload interface 34 is typically a graphical user application providing a portal for the user to communicate, as the client 12, with the server device 14. In this embodiment, it has been recognized that compression of the video file 24 may not be required to perform the upload and in some circumstances can adversely burden the client 12 by requiring additional processing power and capabilities. As such, in order to further offload processing tasks from the client 12 to the server 14, the frame rate, bit rate and resolution of the video content that is being sent is adjusted to balance the competing objectives of file "size" and "upload speed". It has been found that in most applications, the additional time required to send an uncompressed video file 24 when compared to a compressed version of that video file 24 does not render the process slow enough to necessitate compression techniques in order to satisfy the client 12. It will be appreciated that if the client 12 desires, or if the application warrants video compression, a video compression stage may be incorporated into the procedure on the client side 12. As will be explained below, video compression may be desirable when streaming video as shown in FIG. 4, in particular because the processing at the client side for such compression would be done automatically at a permanent or semi-permanent streaming module 30.

The upload interface 34 also preferably provides for parameter selection to enable the user to define specific video analysis parameters, e.g. vehicle movements, shopper behaviour, constraints, time periods etc. The parameters can be used by the server 14 for custom analyses and to provide better/specific computer vision where appropriate. The parameters are sent over the network 16 to the server 14 as a set of parameters with the video file 24. The client 12 may also have access to a report interface 36, which enables the user to obtain, view, print, store, send etc., any information pertaining to data extracted from the video file 24 that is made available by the server 14. It has been found that the parameter selection is preferably minimized so as to not overly burden the client 12 with additional processing tasks. As will be explained in greater detail below, it has been recognized that configuration of the video analysis 42 for a particular video file 24 can be more efficiently performed at the server side 14. In this way, the user at the client 12 is not required to generate configuration settings 44 for each and every video for the video analysis 42 aside from routine parameter selection and the initiation of an upload to the server 14. The server 14 thus offloads even more processing from the client 12 offering a better and more efficient service to the client 12. This centralized approach to generating configuration settings 44 also allows greater consistency in the end result of the analysis and does not rely on the skill or attention of the user at the client side to perform the necessary steps. Also, since different users may act on behalf of the client 12 at any given time, the configuration shown in FIG. 3 does not have to rely on restricted users or significant user training at the client 12.

At the server side, the uploaded video file 24 and the associated parameters selected by the user are received and stored in a video storage 38. The video file 24 may be stored amongst many other video files 24 which may originate from the same client 12 and/or various other clients 12 (not shown). Since many video files 24 may be stored for processing at the server 14, a video queue 40 may be established to prioritize and schedule the delivery of selected video files 24 to the video analysis stage 42. While the video files 24 are stored and waiting to be analyzed, the video file 24 is examined and configuration settings 44 generated and stored at the server 14. The configuration settings 44 are determined and modified in a configuration stage 56, which may be performed remotely by a different entity.

The video storage 38 and video queue 40 stages are shown separately only for ease of explanation. It will be appreciated that the video content may be uploaded directly into the video queue 40, i.e. not stored in the traditional sense. Also, the video queue 40 may instead be a scheduling task run by the video storage 38 in order to prioritize the analysis process. As shown, the video stream may be stored locally at the server 14 in the video storage 38, and then be added to the queue 40 when appropriate. The video queue 40 can prioritize video analyses based on time of arrival, a service level (if a paid service is used) or in any other order as defined by the administrator of the server devices 14. Moreover, as noted above, the queue 40 enables the server 14 to handle multiple video streams incoming from multiple clients 12 such that priorities can be optimized. The video upload and the necessary parameters (once stored) are fed to a video analysis module 42.

The video analysis module 42 applies either custom computer vision algorithm(s) defined by the configuration settings 44 as defined in the configuration stage 56, or may apply one or more pre-stored, pre defined algorithms. It can be appreciated that the same pre-stored, pre defined configuration settings 44 can also be applied to multiple video files 24. This may be useful where different video files 24 relate to a similar "scene" or "study" and thus capture similar behaviour that can be analyzed in a consistent manner. This allows a client 12 to define parameters and have the configuration stage 56 performed only once and the outcome of this applied to each and every video file 24 that is uploaded. The nature of the methods and the operation of the video analysis module 42 may vary based on the type of content being analysed and the user-specified parameters. For subscription-type services, the server 14 may then store customer-specific profiles that can be loaded when that customer's content is next in the queue 40. This enables the server 14 to act as a remote service for many clients 12 thereby providing capabilities that may otherwise be too expensive for many individual clients 12 to implement.

The extracted data generated by the video analysis module 42 is stored in a data storage module 46 and the video file 24 that has been analyzed may be compressed at a video compression stage 48 when performing automatic or partially automatic post processing, so that it may be efficiently transferred to a post processing stage 50 along with the extracted data stored in the data storage module 46. It will be appreciated that the video compression stage 48 and data storage module 46 need not be separate and distinct stages, namely the resultant data and a copy of the video file 24 may be transferred directly from the video analysis stage 42 to the post processing stage 50. However, as will be explained below, the data storage module 46 and video compression stage 48 may be implemented by an entity that is different than that which performs the video analysis 42, and in which case these stages would be needed to enable the transfer between separate entities. It will be appreciated that the stages shown on the server side in FIG. 3 (and FIG. 4 as explained below) are shown as being performed collectively within a single server entity 14 only to illustrate generally those stages that are preferably offloaded from the client 12. Embodiments will be described below wherein the server 14 is comprised of more than one server entity or device and thus the server 14 may be considered one or more server entities or devices that are responsible for the processes shown on the server side 14.

In a traffic analysis embodiment, the resultant data is in the form of one or more tracks. Typically, all tracks in the video content are extracted, regardless of the object that has created them or what information is actually relevant in terms of reporting results. The track data can be stored in the data storage module 46 in the form of position, time and object vector points. At a later time, the track data can be "mined" based on certain criteria. For example, in such a traffic application, vehicle movement (e.g. how many turn left) or vehicle speed (e.g. how fast are the trucks going) may be of interest. To ascertain this information, all tracks from the video content can be imported that were extracted in the first layer of signal processing (i.e. the tracking) and then a second layer of signal processing can be conducted to "ask" questions of the track data to extract such information of interest. In this example, if cars are of interest, trucks and people can be filtered out etc. The tracks can thus be extracted and stored for later analysis, whereby it can then be determined where the desired information is. In this way, result data can be obtained either in real time or at a later time. It will be appreciated that tracks are only one form of resultant data produced by the video analysis stage 42.

It has been recognized that since the video analysis 42 may not be perfect and for some algorithms and/or types of video content, the results may not be reliable enough to ensure consistency. To mitigate such unreliability and to offer an improved quality of service, the post processing stage 50 is included at the server side. The post processing stage 50 may conceptually be considered a quality assurance (QA) stage that is performed in order to review the extracted data so as to verify the integrity of the extracted data with respect to what actually occurred in the video file 24, correct any errors that are found and, in general, ensure that the analysis is satisfactory. The post processing stage 50 allows the server side to separate duties amongst several server devices. The post processing stage 50 is typically performed in an automatic or partially automatic fashion but may also be performed manually by a human operator. In one embodiment, as video files 24 are processed in the post processing stage 50, a determination is made based on known or pre-stored information about the video, e.g. based on previous videos, as to which one of the processing streams to use, namely automatic or partially automatic. In the fully automatic and partially automatic processing streams, little or no QA is required. In some applications, manual processing involving manually tracking, identifying and classifying objects may also be an optional processing steam. In a fully automated stream, no post-processing would be needed, i.e. nothing to "correct". The choice of which stream to use may vary based on the nature of the video content. Typically, a computing device may be used to evaluate all or portions of the video content to determine if any further processing is required. In some embodiments, a human operator may instead or also be used to determine which level or stream should be used. In other embodiments, the characteristics of the video content may be used to assist a human operator's decision. The post processing stage 50 in general may flag areas in the video file 24, to the operator, where the computer vision or video analytics techniques failed, or where there is reduced or lack of confidence in the results. For example, a level of confidence can be assigned to each object, indicating how probable it is that the object is actually an object of interest such as a vehicle in a traffic video. A level of confidence may also be assigned as to how confident the video analysis stage 40 is at estimating the movement of the object, e.g. left turn, right turn, through intersection, etc. The post processing, 50 can utilize a tool to jump to tracks in the video with a confidence level below a certain threshold, e.g. 70%, so that the operator only needs to examine those results that are not within a range of confidence.

The post processing 50 may result in a modification of the extracted data and may determine modifications to the configuration settings 44 to improve further video analyses for that client 12 or category of video content. If so, configuration feedback can be provided to the configuration settings 44. The data, whether it has been modified during post processing 50 or not, is analysed at a data analysis stage 52 to generate information that extracts meaning from the data for the purpose of making understandable information regarding the analysis available to the client 12. The analysed results are then stored in the form of report data in a report storage 54 and returned to, accessed by, or downloaded by the client 12 through the report interface 36.

FIG. 4 provides an overview of the data flow from the client side to the server side for an arrangement such as that shown in FIG. 2(*b*). In FIG. 4, like elements are given like numerals and modified elements with respect to FIG. 3 are given like numerals with the suffix "a".

It can be seen in FIG. 4, that where the streaming video module 30 is used, the video content may be fed directly into a video compression module 60 (if used) and then sent to the server 14 via the network 16. The user interface 28a may be accessible externally by a user at the client 12, or may simply store client configuration settings and parameters 58 and report data in the report interface 36a for later retrieval as shown in FIG. 4. Alternatively, the client interface 28a may be internal to the streaming module 3. In such an embodiment, an auxiliary data link would be provided (not shown) for modifying or adding configuration settings and parameters and to obtain report data 36a or reports derived therefrom. The data link could be provided by a standard computer port or data connection. In this way, a remote synchronization or a calibration performed by a technician on site or at the vendor can be performed. In the embodiment shown, the report data 36a and client configuration settings and parameters 58 are instead stored at a separate module 28a and the streaming video module 30 is only responsible for obtaining, compressing and sending video content to the server 14. In this way, a central client side entity can control multiple streaming video modules 30, such as at a retail store, amusement park or casino.

Aside from the separation of tasks at the client side 12 as exemplified in FIG. 4, there are various other modifications that may be appropriate when compared to the configuration shown in FIG. 3 for implementing a streaming video configuration. As discussed above, in the embodiment shown in FIG. 3, video compression and decompression for transporting video files 24 to the server side may be undesirable and burdensome to the client 12. However, when streaming a video as it is acquired, smaller "chunks" of data are transported at a time and thus video compression 60 as shown in FIG. 4 in dashed lines (signifying an alternative or option) may be suitable. Also, since the streaming module 30 would typically be a permanent or semi-permanent piece of equipment that operates more or less in a stand alone fashion rather than a temporary setup, the addition of video compression, done automatically in the module 30, would likely not be considered burdensome. As such, video compression 60 may be more typically used in the embodiment of FIG. 4. However, as noted above, if desired, video compression 60 may still be implemented in the arrangement shown in FIG. 3.

Naturally, when a video compression stage 60 is used at the client side, a video decompression stage 62 is required at the server side in order to analyze the original video content.

In FIG. 4 the video decompression stage 62 is shown as being performed prior to video storage 38, however, it will be appreciated that such video decompression 62 may instead be done before entering the video queue 40, prior to entering the video analysis stage 42 or even during video analysis 42 whereby video is decompressed as it arrives. Another consideration to be made in the embodiment shown in FIG. 4 is whether video compression 48 is needed when the client 12 streams video content to the post processing stage 50. When streaming video, smaller chunks of video data are processed at a time and thus uncompressed video may suffice without adversely affecting throughput. As such, the video compression stage 48 is shown in dashed lines in FIG. 4 to signify that this stage is readily optional.

It may be noted that in a streaming video configuration such as that shown in FIG. 4, typically many hours of video are obtained for the same scene or location (in a study), i.e. the streaming module 30 may be more or less fixed. In these environments, the configuration of the video analysis 42 may only be needed once for all video taken from that particular module 30. As such, when compared to FIG. 3, the embodiment in FIG. 4 may divide the configuration stages between the client configuration steps taken in stage 58 and those performed at the server side in a server configuration stage 56*a*. In this embodiment, the client 12 would be required to assist in the configuration process at a set-up stage and then these configuration settings can be used and refined by the server 14 thereafter. The choice of which configuration steps are to be performed at which side is dependent on the application and these duties may be divided on an application by application basis and according to the involvement of the client 12. This allows a suitable amount of processing burden to still be offloaded to the server side 14 while engaging the client 12 during set-up to ensure the video analysis 42 meets their expectations. Of course, if so desired, all configuration steps may be taken at the server side as shown in FIG. 3.

The other stages shown in FIG. 4 that are identical to those shown in FIG. 3 would operate in a similar manner and thus detail thereof need not be reiterated.

In either of the configurations shown in FIG. 3 and FIG. 4, parallel transmission and processing streams may be used, which is particularly advantageous when compressing and decompressing the video content. In such an embodiment, once the video content has been loaded and the parameters and/or configuration settings obtained (if applicable), the video content can be compressed and the compressed video stream and parameters/settings sent to the server 14. In one embodiment, the video content can be decompressed at the client side (if necessary) in one thread, the video content also compressed in another thread, and streamed to the server 14 in yet another thread. This enables a parallel decompress, compress, stream and analysis. In this way, the server 14 can receive the stream and start analyzing and storing the video content while the upload is still occurring such that in some cases a large portion of the video analysis stage 42 can be completed by the time the video content is finished uploading. This parallel decompression/compression/stream/analysis enables the system 10 to efficiently handle large amounts of data without creating significant bottlenecks at either side. The total time to conduct the analysis would in this case be equal to the upload time plus the remaining analysis packets being processed thereafter.

It will be appreciated that the parallel steps described above can be achieved in general by parallel execution of different sequential blocks of system code that enables such parallel processing. As such, rather than separate threads, an inter-process communication (IPC) method could also be used where multiple executables run with a single thread in each to accomplish the same effect. Also, both client 12 and server 14 may use threads internally to facilitate asynchronous transfer of data over, e.g. TCP/IP, while performing other operations (compression, decompression etc.).

The video content can, therefore, be processed and analysed by the server 14 during and after uploading (if necessary), and report data can then be sent back to the client 12 when required. The report interface 42 can then be used to generate reports in any suitable format such as *.PDF, *.XLS, *.DOC etc. Any other user-specific format can also be customized. It will be appreciated that a web service interface (not shown) can also be incorporated into system 10 to enable third party developers to interface with the system 10, e.g., via an API.

It can therefore be seen that the client side can be configured in many different arrangements to enable the user to obtain and feed multimedia content to the server 14 in a way that is suitable to the application. As noted above, in traffic applications, the arrangement shown in either or both FIGS. 3 and 4 may be desirable whereas in retail applications, the arrangement in FIG. 4 is likely more desirable.

Turning now to FIGS. 5(*a*) to 5(*d*), various configurations for a video collection unit (VCU) 70 are shown. The VCU 70 is one way of capturing video of a scene from a specific vantage point, often at some elevation. The VCU 70 may therefore be used for obtaining video at stage 32 in FIGS. 3 and 4, and in some embodiments can include the streaming video module 30. FIG. 5(*a*) illustrates a particularly suitable configuration for obtaining traffic data in a traffic study where the VCU 70*a* is deployed only for the length of the study.

In FIG. 5(*a*), a camera 20 also identified as component A is mounted at the uppermost end of a mast 74, also identified as component B, which is preferably telescopic to assist in deployment and to enable the VCU 70*a* to be collapsed into a more manageable size for transport. The mast 74 is most suitably supported by a tripod base 76, identified as component C, through a connection therebetween. The tripod base 76 in this configuration provides a convenient mounting position for an electronics box 78, which is identified as component D. To further support the VCU 70*a*, weights 80 may be used to stabilize the tripod base 76 and act as a theft deterrent.

Figure 6:
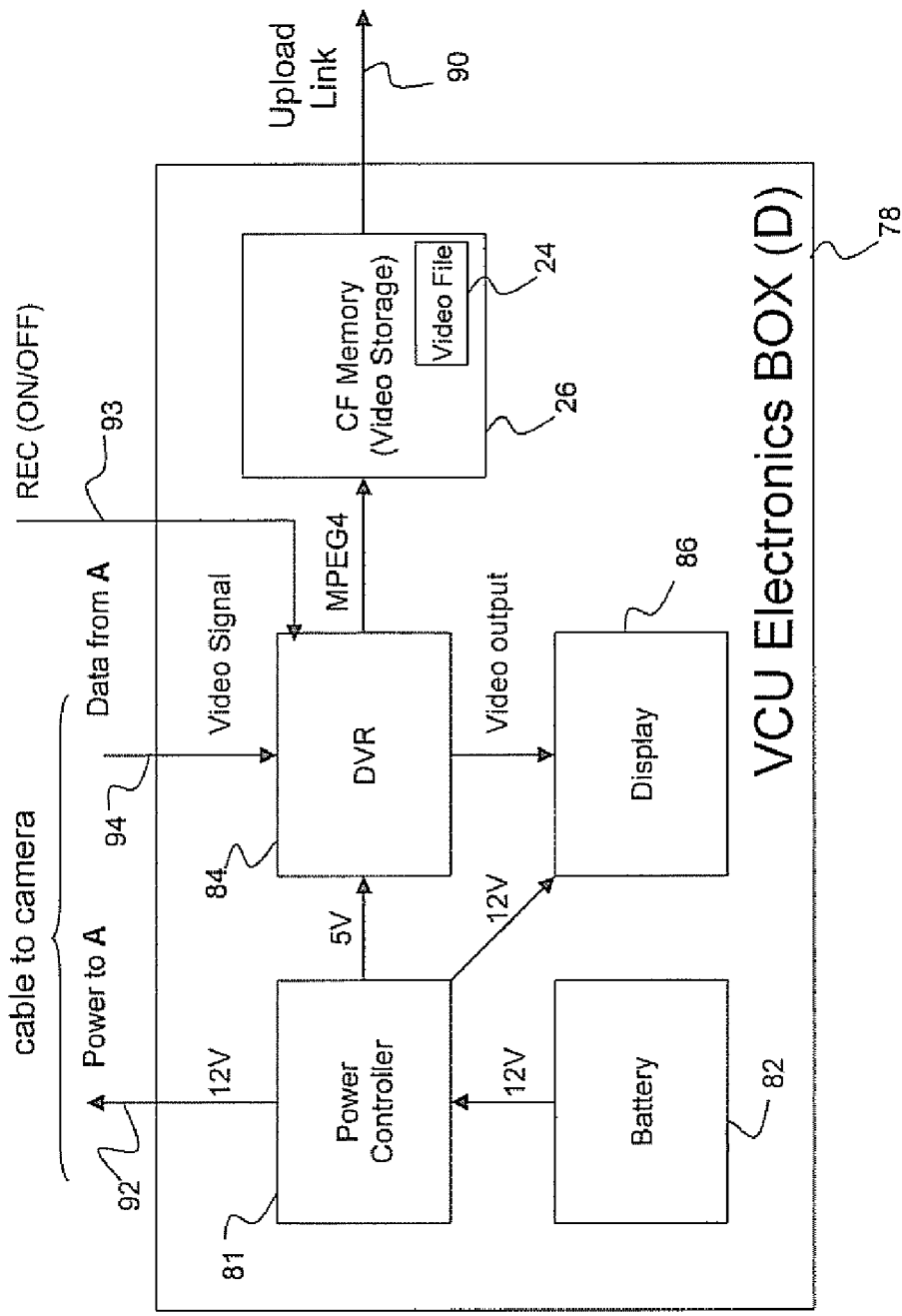
FIG. 6 is a schematic block diagram showing further detail of the video collection unit electronics box identified by "D" in FIGS. 5(a), 5(c) and 5(d).

Video content obtained by the camera 20 may be transmitted through a cable (not shown) running through the mast 74 or wirelessly (Bluetooth, 802.11 etc.) into the box 78. It will be appreciated that more than one camera 20 may be used in a single VCU 70. The mast 74 is suitably a fibreglass structure capable of telescoping from a collapsed length of 6 feet to an extended length of 25 feet although other mast sizes may be appropriate. The mast 74 enables the camera 20 to be elevated to a desired vantage point. To accommodate the extension and retraction of the mast 74 to different heights, the cable running therethrough is advantageously an accordion type cable. The tripod base 76 may be of the collapsible type to facilitate quick deployment and to reduce the size of the VCU 70*a* for transport. With both collapsible mast 74 and tripod 76, it has been found that the VCU 70*a* shown in FIG. 5(*a*) can be reduced to a size that may fit in most vehicles, which makes the VCU 70 convenient for transporting, from site to site. The tripod base 76 can be equipped with a cabling system (not shown) to deter theft and tampering. If used, the cabling system utilizes a cable that weaves through various points on the VCU 70 and locked to itself using a padlock. In this way, the components of the VCU 70 can be locked to each other so that it becomes more difficult for someone to steal individual components. By locking the components together, including the weights 80, theft of both the individual components and the entire VCU 70 can be deterred. The electronics box 78 is suitably a weatherproof, lockable box that contains, among other things, one or more digital video recorders (DVR) 84 for capturing video content obtained by the camera 20. Further detail of the box 78 is shown in FIG. 6 and described below. It has been found that the use of nine 20 pound weights 80 is sufficient for stabilizing a VCU 70a in the configuration shown in FIG. 5(*a*).

FIG. 5(*b*) illustrates a VCU 70b wherein only a camera 20 is used to obtain the video and the video files 24 are either stored locally in the camera 20 or streamed/sent to an external location for uploading to the server 14. Examples of this configuration are in environments where cameras 20 are part of existing infrastructure such as highway cameras, retail/security cameras etc. FIG. 5(*c*) illustrates a VCU 70c that includes only a camera 20 and the electronics box 78. This configurations may be suitable where infrastructure exists only for elevating the camera 20. In this example, the camera 20 is connected directly to the box 78 and mounting in an appropriately elevated position such as on a telephone pole or light standard. The video files 24 would thus be stored in the box 78 and later accessed, downloaded or the box 78 retrieved for uploading to the server 14. Yet another configuration of the VCU 70d is shown in FIG. 5(*d*). In this configuration, further elevation is required beyond that which exists in the infrastructure provided and thus the mast 74 is also used. This may be appropriate for extending higher than, e.g. a signal mast at an intersection or where the telephone pole is not quite high enough. This configuration also allows for an operator to raise the mast 74 without requiring assistance such as a step-ladder.

It can therefore be seen that many configurations are possible for obtaining the video content and other configurations not shown in FIG. 5 are possible to suit the particular environment. For example, the configuration in FIG. 5(*a*) may not require weights where the tripod base 76 can be fastened to the underlying surface to stabilize the VCU 70a.

The electronics box 78 is shown in greater detail in FIG. 6. As noted above, a video signal is transmitted from the camera 20 and ultimately to the box 78. A video transmission line 94 thus carries this video signal into the box, which is fed into the DVR 84. The DVR 84 records the video signal into an appropriate video format, e.g. MPEG4 (as shown) or H264, which is represented as the video file 24, which can be stored in memory 26. It may be noted that additional inform-nation may be stored with each video file 24 that identifies more information regarding the content of the video file 24. For example, a text file may be generated by the DVR 84 for each group of video files associated with a single study collectively referred to by numeral 24. As can be seen in FIG. 6, a power controller 81 is used to distribute power within the box 78 that is supplied by a battery 82. In this example, the power controller 81 provides 12V to the camera 20 over a power connection 92, provides 5V to the DVR 84 and provides 12V to a display 86. The display 86 is used to display a video output for the user. The video output can assist the user in setting up the VCU 70 to ensure the proper scene is captured. The video output may be in two forms, before recording and after recording. As such, the display 86 may show the video as it is being recorded or while any video signal is being obtained as well as show the recorded video clip, e.g. to verify the video content before transferring the video file 24 to the server 12. The box 78 also includes an upload link 90 which may comprise any connection, wired or wireless that is capable of enabling access to the video file 24 for the purpose of uploading video files 24 to the server 14. The DVR 84 can be controlled by an input 93 that indicates when to start and stop a recording. It will be appreciated that such an input 93 may be a user input or an input from a processor or other device that controls operation of the VCU 70, e.g. according to a defined schedule.

It may be noted that the use of an electronics box 78 and a regular camera 20 has been found to provide a robust video acquisition configuration. In other embodiments, a smart camera or digital video camera may be used rather than having the box 78. However, in environments where weather or theft are an issue, the lockable electronics box 78 is more suitable. Also, by providing the display 86 closer to the base of the VCU 70, the user is better able to ensure that the camera 20 is pointing in the right direction.

Figure 7:
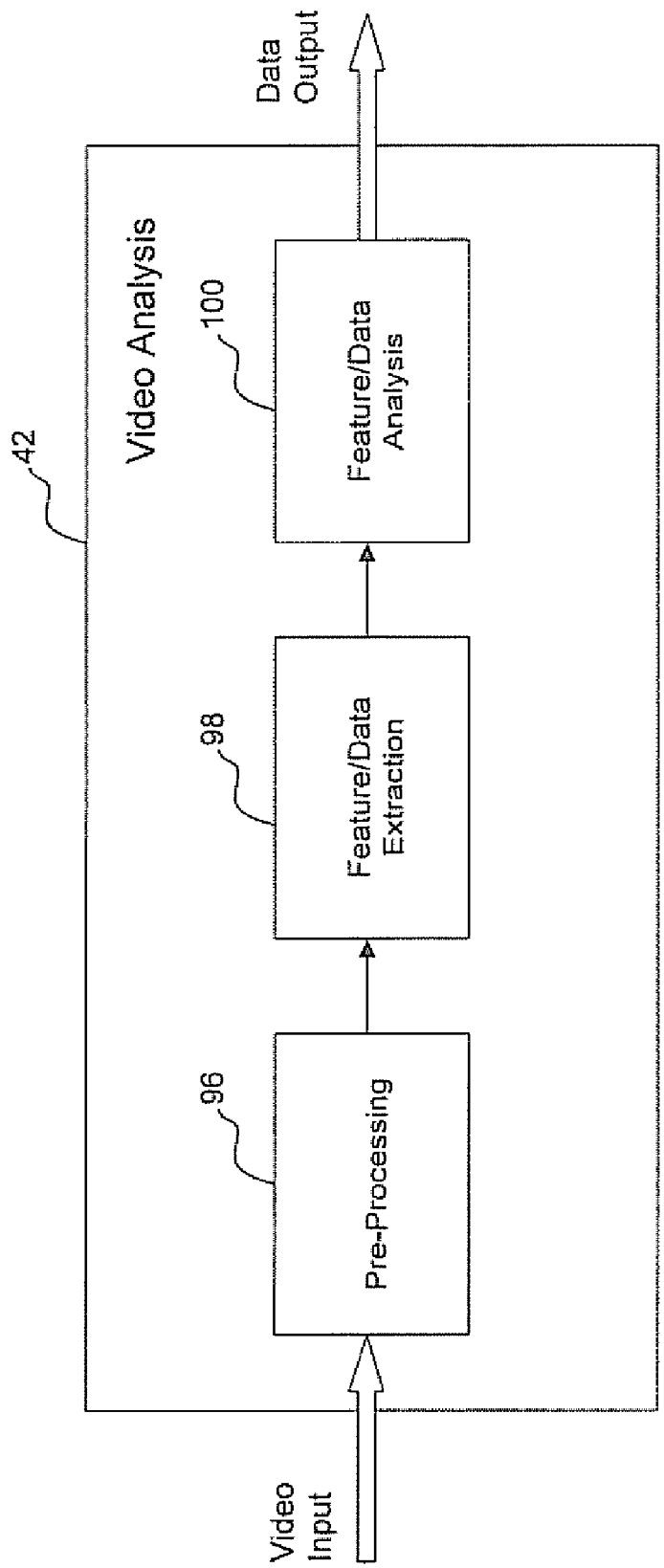
FIG. 7 is a block diagram showing general stages in the video analysis operation shown in FIGS. 3 and 4.

Turning now to FIG. 7, the video analysis stage 42 is shown in greater detail. In general, the video analysis stage 42 receives video content as an input, processes the video content according to various modules and outputs data representative of the analysis of the video content. Conceptually, the video analysis stage 42 utilizes a framework described as a graph having algorithm or process modules as nodes and interfaces as edges. In one embodiment, each module (node) in the graph accepts input in the form of one or more of the following: video frames, frame masks, tracks, objects, messages. Each module also outputs one or more of these data types and executes a specific algorithm. The algorithm may be computer vision or any general information processing task. Typically, the input to the analytics framework graph would be video content (e.g. file 24 or stream) comprising digitized frames and the output data would be data relating to the video content.

The above framework has been found to be particularly suitable for being executed on a DCS platform since each module can be executed on a distinct computing/processing node such as a distinct CPU. Also, by using well defined interfaces between the modules, the framework has been found to be particularly robust and easy to develop on and scale. In this way, the framework can be customized to suit particular customer needs without requiring an intimate knowledge of the inner workings of each module, only the inputs and outputs. FIG. 7 illustrates three general sub-stages in the video analysis stage 42 that each may include one or more individual modules and accompanying edges or interfaces. Also, each sub-stage may be implemented on one or more distinct computing nodes, e.g. in a DCS 130. The three sub-stages shown in FIG. 7 are a pre-processing stage 96, a feature/data extraction stage 98 and a feature/data analysis stage 100.

In the embodiments that will be described below, the pre-processing stage 96 comprises the steps taken to prepare the video content for the analysis procedure. For example, the video content may be modified to correct for environmental factors and registered to correct for movement of the camera 20. The pre-processing stage 96 enables the feature/data extraction stage 98 to more accurately identify objects and events in the video content and do so consistently from frame to frame and from segment to segment. Stage 96 in general looks for any characteristic of interest to the client 12 for the purpose of extracting information about the video content. The feature/data analysis stage 100 typically compares the extracted features and data to predetermined criteria or expected results to generate the output data. This may include classifying objects found in the video in a certain way for counting or event detection etc. It will be appreciated that the general steps 96-100 shown in FIG. 7 are meant for illustrative purposes only and that more or fewer stages may be used depending on the application and complexity of the video content and the complexity of the computer vision techniques used.

Figure 8:
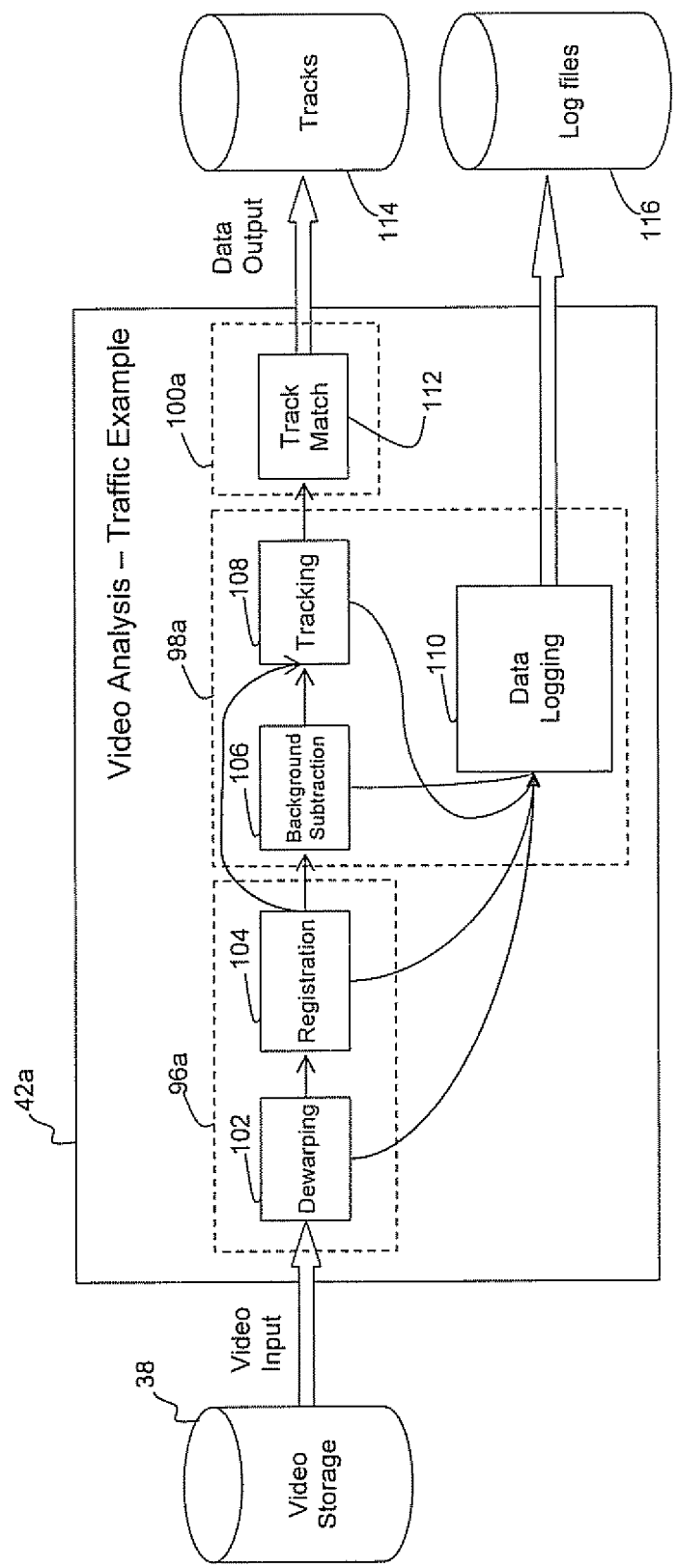
FIG. 8 is a block diagram showing an embodiment of the video analysis operation for analyzing traffic video content.

FIG. 8 illustrates an example of the video analysis stare 42 adapted for performing traffic video analyses 42a. The framework shown in FIG. 8 would be used for the collection of traffic data from a video file 24. The input to the video analysis 42a is a traffic video that has been obtained, for example, by the VCU 70, stored in memory 26, uploaded to the server 14 and stored in the server side video storage 38. The output of the video analysis 42a is a set of tracks and a log file detailing the operation of the video analysis 42a. In this example, it is assumed that the video file 24 is obtained by an elevated camera 20 using a VCU 70. In this example, the camera 20 records video of an intersection, which is later uploaded through the client interface 28 to the video storage 38.

The video file 24 is fed into the video analysis module 42 on a frame by frame basis. The first module encountered is a dewarping module 102, which performs dewarping on the input frames to correct for optical aberrations such as barrel distortion introduced by the camera's wide angle lens (if applicable). The dewarping module 102 outputs a stream of frames to a registration module 104, which registers frames to each other according to a datum (e.g. fixed structure that is seen frame to frame) as they arrive to correct for camera motion due to environmental factors such as wind. The output of the registration module 104 is a stabilized stream of frames that is then fed into a background subtraction module 106 and into a tracking module 108.

Figure 9:
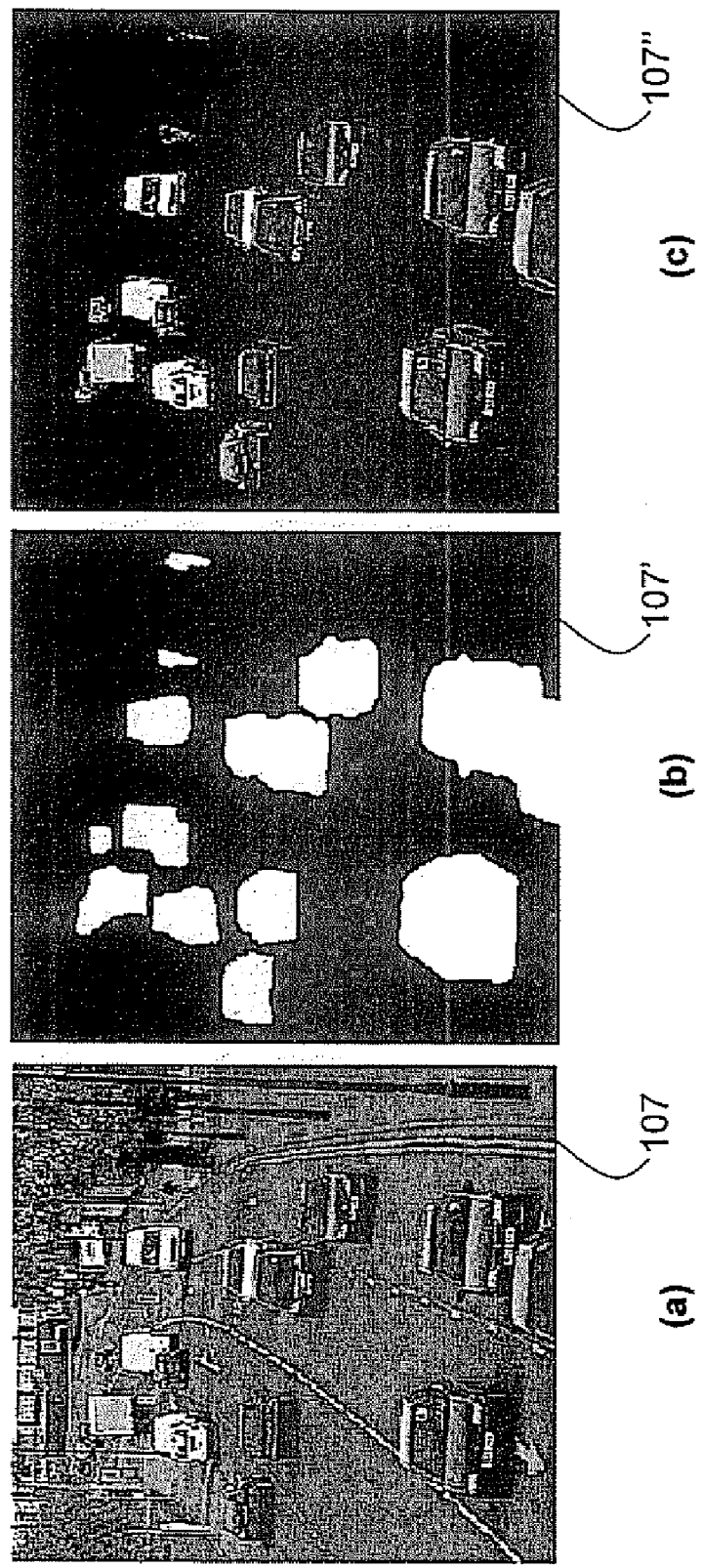
FIG. 9 illustrates an object segmentation operation

The background subtraction module 106 uses the stabilized stream of frames 107 to form a model of the scene background and outputs a segmentation mask 107' indicating where foreground objects are located. Any suitable background subtraction algorithm can be used, for example that described in "P. KaewTraKulPong, R. Bowden, *An Improved Adaptive Background Mixture Model for Realtime Tracking with Shadow Detection*, September 2001, *Proceedings of 2nd European Workshop on Advanced Video Based Surveillance Systems*". An example of the process and results of the background subtraction module 106 is shown in FIG. 9. An example of the segmentation mask 107' is shown in frame (b) in FIG. 9. FIG. 9 also shows a modified frame 107" showing only the foreground objects. The segmentation mask and the registered frame from the registration module 104 are fed into the tracking module 108. The tracking module 108 first locates connected components in the segmentation mask and uses, e.g., a mean shift kernel tracking operation to track objects as they move through the scene. The tracking module 108, similar to other video tracking systems, employs a motion model which describes the expected behaviour in consecutive frames of the object to track. The mean shift kernel tracking operation is one of various common algorithms for target representation and localization. The mean shift kernel tracking operation is an iterative localization procedure based on the maximization of a similarity measure. The tracking module 108 thus produces object tracks, which are fed into a track match module 112, which matches each observed track to one of a number of ideal tracks. These observed tracks may include, for example, a right turn, a left turn, straight thru etc. The ideal tracks are then output from the video analysis module 42a and recorded in a track storage module 114 or other memory.

During the dewarping 102, registration 104, background subtraction 106 and tracking 108 operations, a data logging module 110 details the operation of the video analysis module 42a. The data logging module 110 produces a log file that is stored in a log file data storage module 116 or other memory.

The data logging module 110 can generally be used to track and record any information that pertains to the overall video analysis process 42a. For example, the general operation of the video analysis module 42a can be logged, e.g. which modules ran successfully, how long each module took to run, what kind of input was obtained, etc. Module specific information can also be logged, such as internal algorithm parameters, e.g. object movements, intermediate values of long or complicated calculations etc. The log files can be used for testing and debugging purposes, but may also be used for record keeping such that the performance history of the video analysis module 42a can be monitored over time.

Figure 10:
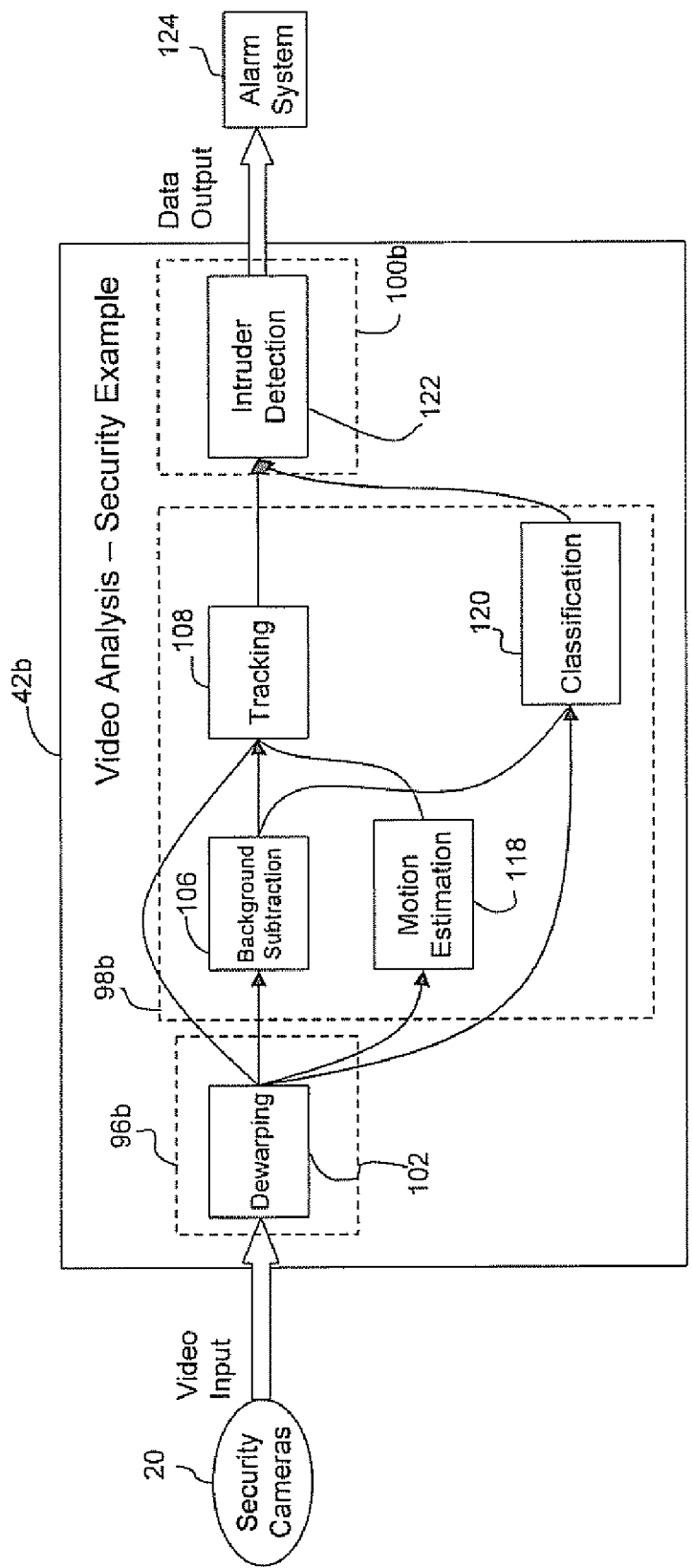
FIG. 10 is a block diagram showing another embodiment of the video analysis operation for analyzing video content to detect events in a scene such as for security applications.

Turning now to FIG. 10, another example of how the video analysis module 42 may be adapted to a particular application is shown. The example shown in FIG. 10 is directed to security video analysis 42b for monitoring a set of security camera feeds and setting off an alarm when an intruder is detected. The input to the video analysis module 42b is a video feed from a fixed and typically stationary security camera 20, and the output would be an alarm signal in this example. In this example, it may be assumed that the environment being observed comprises a stationary camera which captures video of a particular area or scene. The camera 20 in this example is assumed to be capturing video of an indoor scene, for example in an office building.

Similar to the traffic example, the video feed is fed frame by frame into the video analysis module 42b. The first module in this example is a dewarping module 102 which, similar to that described above, corrects for barrel distortion introduced by the camera's wide angle lens. The dewarping module 102 outputs a stream of frames into the background subtraction module 106 and a motion estimation module 118. As before, the background subtraction module 106 computes a segmentation mask that indicates where foreground objects (in this example potential intruders) are located. The motion estimation module 118 computes optical flow on its input frames, which indicates the direction of motion of any objects in the scene. Optical flow may be computed by locating feature points in each frame (also referred to as Harris corners), performing motion estimation for each keypoint using a cross correlation search, and interpolating motion vectors for all pixels using a k nearest neighbours (kNN) operation. It will be appreciated that other algorithms may instead be used for determining optical flow such as the Lucas-Kanade method.

The data from the background subtraction module 106 is fed into the tracking module 108 and a classification module 120. The data from the motion estimation module 118 is also fed into the tracking module 108. The tracking module 108 uses, e.g., active contours to track moving objects in the scene. The classification module 120 classifies objects, (e.g. using Scale Invariant Feature Transform (SIFT) feature points) as either intruders or benign (e.g. moving shadows, security guards etc.). The classification module 120 may use any number of criteria for classifying objects, e.g. size. In one example, each category (e.g. small medium large) would have a specific size that can be compared with objects detected in the video content. This can be done in 3D coordinates rather than 2D as seen on the screen. For each object, it can be classified, e.g. small, medium or large based on how close it is to each of the category sizes. The data from the classification module 120 and tracking module 108 are combined in an intruder detection module 122, which uses heuristics to set an alarm signal. The heuristics, which can be used in any module, are certain rules used to improve the accuracy of the results obtained using that particular module, which is derived from experiment rather than theory. It will be appreciated that any number of heuristics can be used at any stage to improve or make more robust the resultant analysis. In this example, the alarm signal may then be output to an alarm system 124, which may be part of a larger security system.

Figure 11:
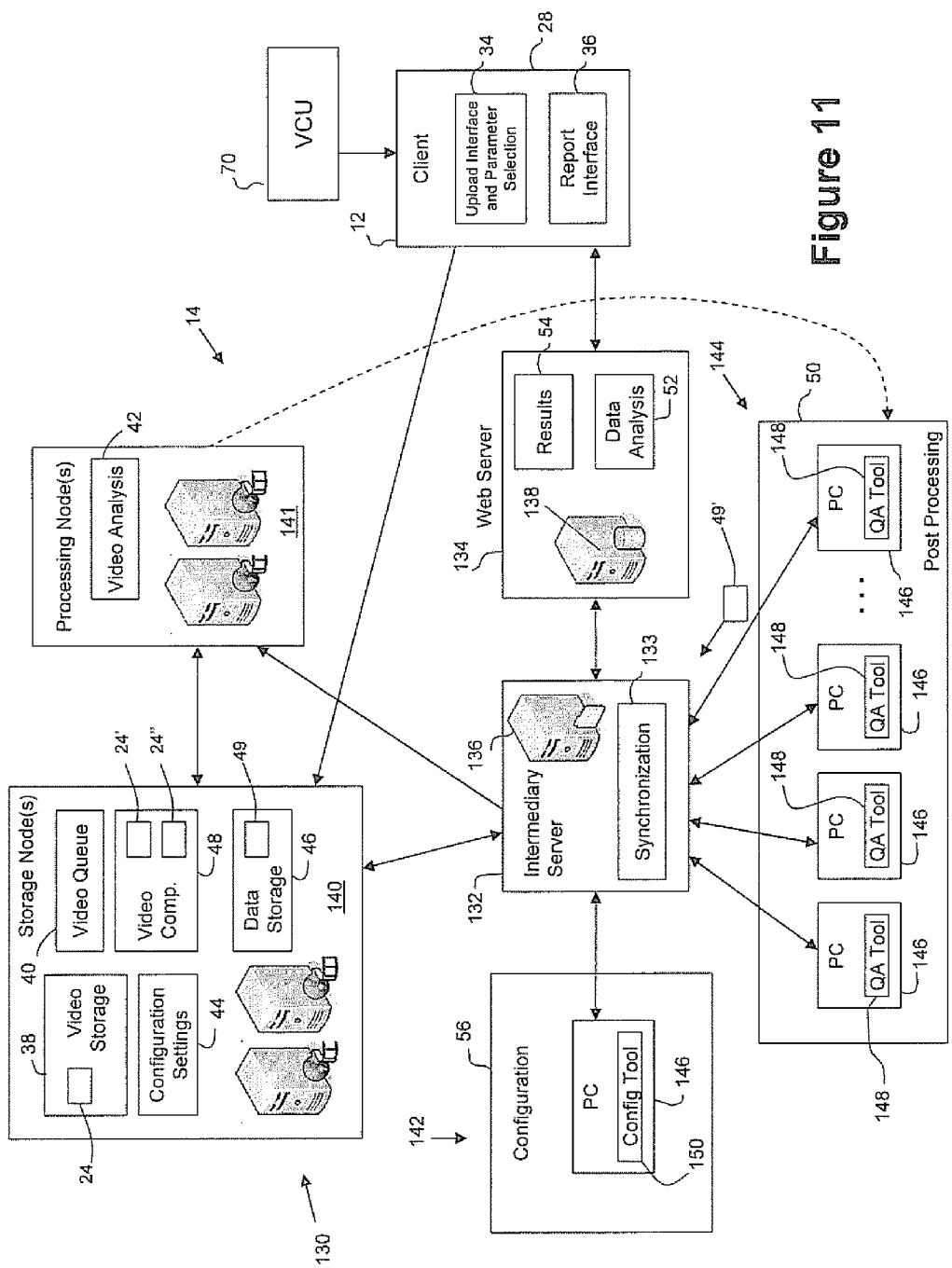
FIG. 11 is a schematic system diagram showing one configuration using multiple server entities for analyzing video content for a client device.

As discussed above, the role of the server 14 shown in FIGS. 3 and 4 may be divided, distributed and optimized by utilizing more than one entity or server device. FIG. 11 illustrates one example wherein the server 14 is comprised of several interrelated entities that each perform one or more tasks in the overall processing of the video content. As can be seen in FIG. 11, the client 12 collects video in this example using the VCU 70 and includes or otherwise has access to the upload interface and parameter selection module 34 and the report interface 36. The client 12 initiates the video analysis process by accessing a web server 134. It will be appreciated that the web server 134 may be accessed through the network 16 shown in FIGS. 1, 3 and 4 or may be accessed through another network. Preferably, the web server 134 is a publicly available website on the Internet but may also, in some applications, be part of a private network, enterprise network, local network, etc. It will also be appreciated that each entity shown in FIG. 11 may be geographically separated or within the same location depending on the application and availability of resources in different locations.

The web server 134 in this example provides a front end interface or "portal" for the client 12. The web server 134 allows the client 12 to initiate a video upload process and to obtain information related to the results of the analysis, generate or access reports, manage billing and account services and perform other administrative tasks as necessary. The web server 134 may also be use to enable the client 12 to perform parameter selection and in other embodiments perform some configuration tasks in generating the configuration settings 44.

In the context of traffic video files 24, many studies run for extended periods of time such as 6 hours. To better manage the upload process, the video file 24 may be stored in fixed-length chunks, e.g. 6-1 hour videos. This avoids the user having to re-upload already completed chunks if the uploading of a later chunk fails during the upload process. This may also be done to further parallelize the analysis. For example, instead of using one computing device to process 10 hours of video content, the video content can be split into 10, 1 hour chunks that can be processed each hour using a separate device. The use of a DCS 130 enables the client 14 to massively parallel process the video content so that complex computer vision techniques can still be used in a reasonable amount of time. The separation of the video file 24 into separate chunks is performed by the DVR 84 during the recording process, at which time accompanying information such as a text file is generated and stored in the memory 26 with the video file 24 to indicate how many chunks of video have been recorded and the length of each etc. The DVR 84 may also process the video file 24 so that it is ready to be transferred to the server 14, e.g. modification of resolution, bit rate, compression etc. The client 12 may then connect the storage device 26 in the electronics box 78 to the client computer 28 and login to a web application 174 (see FIG. 12) hosted by the web server 134. Once logged in, the client 12 may then choose an upload interface (described below). The web server 134 in this example does not actually receive the video upload but rather initiates the upload process by launching a redirection tool, such as an ActiveX control on the client computer 28. If the redirection tool has not been previously installed, the web server 134 assists the client computer 28 in downloading and installing the necessary tool. The redirection tool is used to set up a file transfer to the video storage module 38, which as shown in FIG. 11, resides at an entity which is dedicated to data storage and is separate and distinct from the web server 134.

When using the VCU 70 or another temporary set up, it may be noted that a removeable storage device may be used with the electronics box 78, which allows the user to remove the storage device, connect to the PC 28 and then navigate to the text file etc. by browsing to a file control on the web. To begin the upload, the user may be prompted to indicate which video file 24 in the storage 26 is to be sent to the video storage module 38 at the server side. The user inputs the path to the accompanying information (e.g. text file) that contains a list of the file names corresponding to the recorded chunks in chronological order. This is used to select all chunks associated with the upload. Before uploading begins, the user may also be presented with an opportunity to trim the video file 24 from either end. For example, the user may wish to trim the first 30 minutes and the last 15 minutes to remove unnecessary footage. For example, the user may capture video content that they do not necessarily need to account for set up and take down time. In this way, a 2 hour study from 8 am to 10 am can be obtained from 7:45 am to 10:15 am and the ends trimmed to ensure the actual study is the only video content analyzed. After trimming, the user may then initiate the upload process by selecting the appropriate option.

The upload process in this example initiates a thread that creates a TCP connection to a server machine at one of possibly many storage nodes 140 in a DCS 130, detail of which is provided below. Beginning with the first chunk of the video file 24, an HTTP request header is constructed that conforms to parameters dictated by the receiving storage node 140, including the bucket where it should be stored and a key indicating the name the file will be mapped to. After the request header is sent, the transfer of the request body begins, which is a bit-stream of the video file 24 being uploaded. While uploading the request body, the ActiveX control simultaneously waits for an HTTP response from the server at the storage node 140 indicating either that the uploading of the request body can continue or that an error has occurred and transfer of the request body should stop. If no response is received within a certain time limit, it may be assumed that the error has occurred and the transfer is timed-out. Once the request body is successfully uploaded, the ActiveX control selects the next video chunk for the specified video file 24 and constructs the next request etc. This process repeats until all chunks and any other relevant accompanying information are uploaded. During the upload process, a popup (e.g. numeral 200 shown in FIG. 14) may be presented to the user containing a progress bar and estimated time to complete the upload of all files relevant to the study.

It will be appreciated that the above transfer process from the client 12 to the video storage module 38 is only one example of one efficient way to insert a video file 24 into the server's video analysis queue 40 and other tools, mechanisms and steps may be performed to suit different applications and different client and server types.

The report interface 36, shown on the client computer 28, is also provided in the web application 174 hosted by the web server 134. The report interface 36 is in general any interface by which the client 12 gains access to the information generated from the data extracted during the video analysis stage 42 as well as reports generated therefrom. The report interface 36 can be used to organize the results so that the user at the client 12 can select a set of data for which they would like to see a predefined report. In the context of traffic data, the report could be for an intersection count, roundabout or highway. In a retail setting, the reports may pertain to the number of users following a specific path, conversion rates, etc. The client 12 can be given access to the reports and other information by querying a database that stores the result data 54. The database would receive the query and send back the report to the client 12 through the web server 134. The client 12, using the client computer 28, can organize and display the data in the form of a printable report.

Turning back to the overall server system 14, it can be seen in the example shown in FIG. 11 that the server 14 utilizes several distinct back-end devices or entities to distribute processing and administrative tasks, the web server 134 being one of the entities. An intermediary server 132 is used to coordinate activities and manage the process, including collection of revenue (if applicable). The DCS 130 is used as a scalable source of data storage and processing power. In general the DCS 130 comprises one or more data storage nodes 140 (as noted above) and one or more data processing nodes 141. In this example, the configuration process 56 is performed by one or more administrators at one or more configuration sites 142 that are tasked with generating configuration settings 44 for the videos that in general tell the video analysis module 42 what to look for and how to analyze the video file 24. Similarly, the post processing stage 50 is performed by one or more individual devices 146 at one or more post processing sites 144 running a post processing or "QA" tool 148 for reviewing the data that is extracted from the video file 24, to verify the integrity of the data with respect to what is actually seen in the video, and correct any errors that have been found. The intermediary server 132 comprises a synchronization module 133 which provides access to a copy of the video content and extracted data for the post processing stage 50 and access to a copy of the video content for configuration process 56. The web server 134 also communicates with the intermediary server 132 so that the intermediary seltzer 132 is notified when a new video file 24 has been uploaded to the storage node 130 and where it is being stored. The video files 24, once uploaded, may be stored with the accompanying data in a folder which is referenced uniquely by an identifier. The identifier can be provided to the intermediary server 132 by the web server 134 to enable later access to the video file 24.

The intermediary server 132 oversees and coordinates use of the DCS 130 and has access to copies of the video files 24 and the configuration settings 44. Preferably, the DCS 130 is a virtualized system that is potentially limitlessly scalable to enable more storage and processing capability to be added to increase capacity in step with demand from the clients 12.

As noted above, the intermediary server 132 is notified by the web server 134 when a new video file 24 has been uploaded to the video storage module 38. The video file 24 enters the video queue 40 to await the configuration settings to be generated. The video queue 40 may simply be a conceptual module in that it may exist as a list that is referenced to determine the next video file 24 to access for configuration 56 and/or video analysis 42. As can be seen in FIG. 11, the configuration administrator(s) 142 are connected to or otherwise have access to the intermediary server 132. Upon determining that a particular video file 24 is ready to be configured, in most cases, any time it is in the video queue 40, the intermediary server 132 connects to the appropriate storage node 140, provides the corresponding identifier, and the video file 24 is retrieved.

To optimize the configuration process 56, the intermediary server 132 preferably obtains a downsampled or otherwise compressed or size-reduced copy of the video file, typically by obtaining an image or series of images 24' from the video file 24. The series of images 24' are then stored in the video compression module 48, using the synchronization module 133, and provides the administrator 142 with access to the image(s) 24'. The administrator 142, using a PC 146 running a configuration tool 150, may then perform the configuration process 56. In general, the configuration process 56 involves generating configuration settings 44 that tell the video analysis module 42 what to look for according to the nature of the video content. The configuration tool 150 is preferably an interactive and graphical API that enables the administrator 142 to view the video and select parameters. Similar to the other entities on the server side 14, the administrator 142 is often remote from the other entities and communicably connected through a network 16 such as the Internet. Further detail pertaining to the configuration process 56 and the configuration tool 150 is provided below.

The configuration process 56 generates configuration settings 44 for the particular video file 24, which are stored at the storage node 140. The video file 24 would then remain in the video queue 40 until the appropriate process min node 141 is available, at which time the video file 24 and the configuration settings 44 for that video file 24 are copied to the video analysis module 42 at the appropriate processing node 141. It will be appreciated that many processing nodes 141 may be utilized, each performing specific tasks or provisioned to perform various tasks. Such organization can affect the throughput of the video analyses and thus the intermediary server 132 oversees the workflow to, from and within the DCS 140 and provisions more or fewer storage and processing nodes 140, 141 as needed. As can be ascertained from the connecting arrows in FIG. 11, the copies of the configuration settings 44 and the video file 24 can be copied from the storage node 140 to the intermediary server 132 and then to the processing node 141 or copied directly from the storage node 140 to the processing node 141. It can be appreciated that the file transfer mechanism used is dependent on which common network(s) are available to each entity and the nature of the specific application.

For example, the DCS 130 can be configured as an internal set of computing devices at the server 14 or can be outsourced to utilize any one of various available distributed computing or "cluster" computing solutions such as those provided by Sun Microsystems™, IBM™, Amazon™, Oracle™ etc. In one example, the video analysis 42 process begins by sending a request for a new processing instance to a main processing server 141. The request may include meta data that can be interpreted by the instance such as the location and/or key of the video file 24. If the request is successful, a virtual operating system can be booted and a pre-compiled file system image downloaded from a storage server 140 and mounted on the root directory. The last initialization script may then download and install the analysis code base provided in the configuration settings 44 from the storage server 140 and also download the video file 24 from the storage server 140 based on the user parameters passed to the instance. The user parameters can be retrieved by sending a web request to the main processing server 141. The initialization script in this example then launches the main analysis binary which passes in the locations of the video file 24 and configuration settings 44 as command line parameters. The video analysis module 42 loops through the video file 24 and updates a status file on the storage node 140, indicating a percent completed.

The video analysis 42, examples of which are described above, produces a set of extracted data 49 that is stored in the data storage module 46 at the storage node 140. In one example, the extracted data 49 comprises tracks stored in an XML file, wherein the file stores the track for a given object in the video file 24 by storing a series of points and frame numbers. A downsampled or compressed version of the video file 24" is also generated and stored in the video compression module 48. The extracted data 49 stored in the data storage module 46 is then synchronized to the intermediary server 132 using, the synchronization module 133. This tells the intermediary server 132 that the video file 24 has been analyzed and can be subjected to post processing 50. As indicated by the dashed arrow in FIG. 11, in another embodiment, rather than or in addition to storing the extracted data 49 and the compressed video file 24" at the storage node 140, the extracted data 49 and the video file 24 (compressed or uncompressed) may utilize a direct link between the processing node 141 and the post processing entity 146 so that they are immediately available for post processing 50.

Copies of the compressed video file 24" and extracted data 49 (in an appropriate format such as XML) are then provided to an available QA device 146, at which time the post processing stage 50 may commence. The post processing stage 50 produces, if necessary, a modified set of extracted data 49', wherein any errors have been corrected. The modified extracted data 49' is then sent back to the intermediate server 132 so that it may be redirected to the web server 134 and analyzed by the data analysis module 52 to generate information that can be used in a report or other data conveyance. This information may then be stored in the results storage 54 so that it may be accessed by or provided to the client 12.

Returning to the traffic example, the data analysis module 52 may be used to produce a set of tracks where a track is a series of coordinates indicating where an object is in the frame 107. Events detected in the video content, e.g. movement of an object, can be compared to expected tracks, which immediately indicates whether the event corresponds to a track and which track it is likely associated with. The expected tracks would typically be given during the configuration process 56 and stored in the configuration settings 44. The results storage 54 in this example can be a database that stores events that occurred in the video. For example, in traffic videos, the movement of vehicles and pedestrians may be stored as well as classification of the vehicles. As discussed above, users at the client 12 can generate reports based on these results.

It can be appreciated that the configuration shown in FIG. 11 enables the intermediary server 132 to monitor the process and to collect revenue and outsource certain ones of the steps to optimize the process. It will be also be appreciated that any two or more of the server side entities shown in FIG. 11 may be consolidated into a single entity to accommodate different business relationships or according to available processing and storage capabilities. For example, the intermediary server 132, if appropriate, may host the web application 174 directly and thus not require a separate web server 134. Similarly, the storage nodes 140 and processing nodes 141 in a smaller application may be provided by a more limited number of machines that perform both storage and processing tasks. Also, the configuration sites 142 and post processing sites 144 may be the same operator at the same machine or may be resident at the intermediary server 132. It can thus be seen that various configurations and architectures can be used to operate the server 14 according to the principles described herein.

Figure 12:
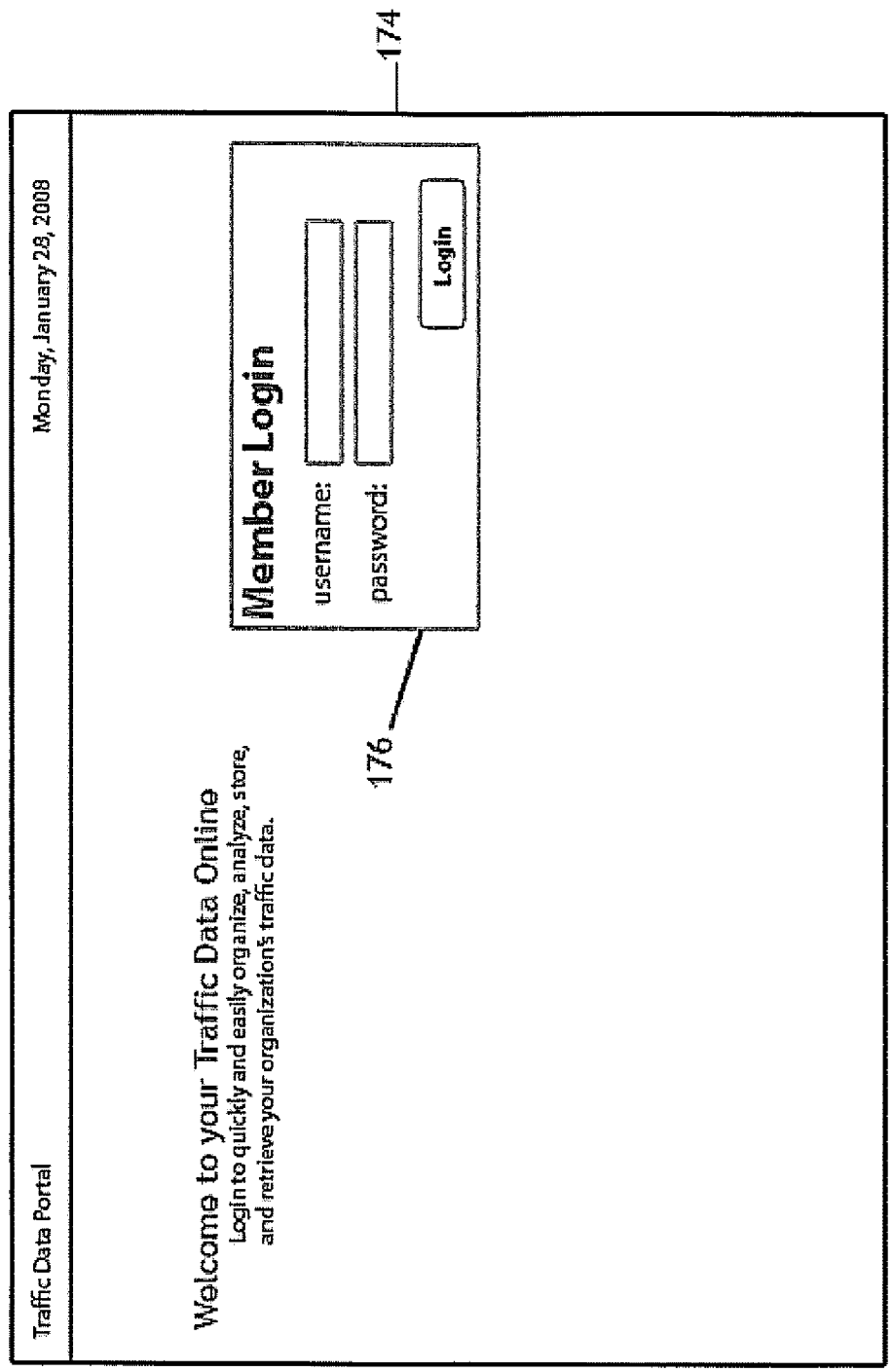
FIG. 12 is a screen shot showing a login screen for accessing a web application to initiate a video upload to the server entities.

As discussed above, the web server 134 provides a front-end interface between the client 12 and server 14 by hosting a web application 174 that can be accessed by users at the client side. FIG. 12 shows an example of a member login box 176 provided by the web application 174, which is accessible through the network 16, and may be accessed by a user in order to organize, store and retrieve video data associated with the client 12. The login box 174 includes standard user-name and password entry boxes for gaining accessing to the user's account on the web server 134. In this way, the server 14 can restrict access to their services and better control the process for the purpose of collecting revenue from the client 12. The web server 134 may provide any suitable user interface to enable the client 12 to access account data, view current jobs, upload new video content and perform any other appropriate administrative task.

Figure 13:
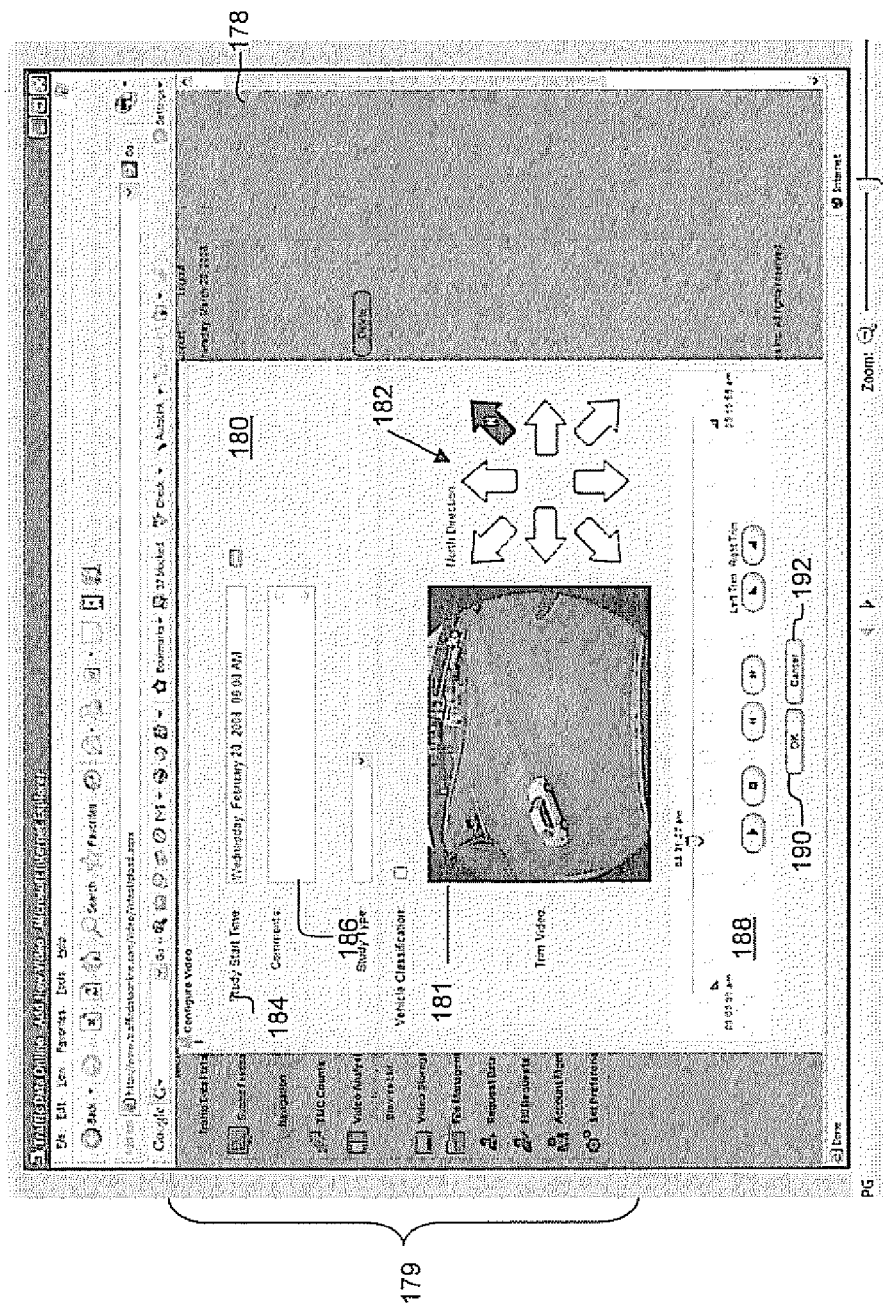
FIG. 13 is a screen shot showing a parameter selection tool accessed by a client device.

FIG. 13 illustrates a main web application portal 178 that is loaded upon logging into the web application 174. The web application portal 178 includes a toolbar 179 in this example situated along the left-hand portion of the portal 178. A parameter settings tool 180, selected from the toolbar 179 is shown in FIG. 13. The parameter settings tool 180 in this example includes a control panel 188 providing typical video player type controls for navigating through a video file 124 and a display screen 181 for viewing the video content for the purpose of selecting certain parameters. As shown in FIG. 13, the user may use a directional tool 182 to indicate North in the video. An entry box 184 is provided to enable the user to specify a study start time. Also provided is a comments input box 186 that enables the user to specify in general terms what should be analyzed in the particular video. In this example, the user has indicated that data for all four approaches in the intersection should be collected. An "OK" button 190 and "Cancel" button 192 are also provided to enable the user to submit the selected parameters or discard the process respectively. It will be appreciated that any number of parameter settings and tools for selecting same can be offered through the portal 178. It has been recognized that the overall process is more efficient and more desirable to the client 12 with minimal set up. As such, it is preferable to offload the generation of configuration settings 44 to the configuration entities 142 while collecting enough information from the client 12 to ascertain the nature of the study and what the video analysis 42 should be looking for.

Figure 14:
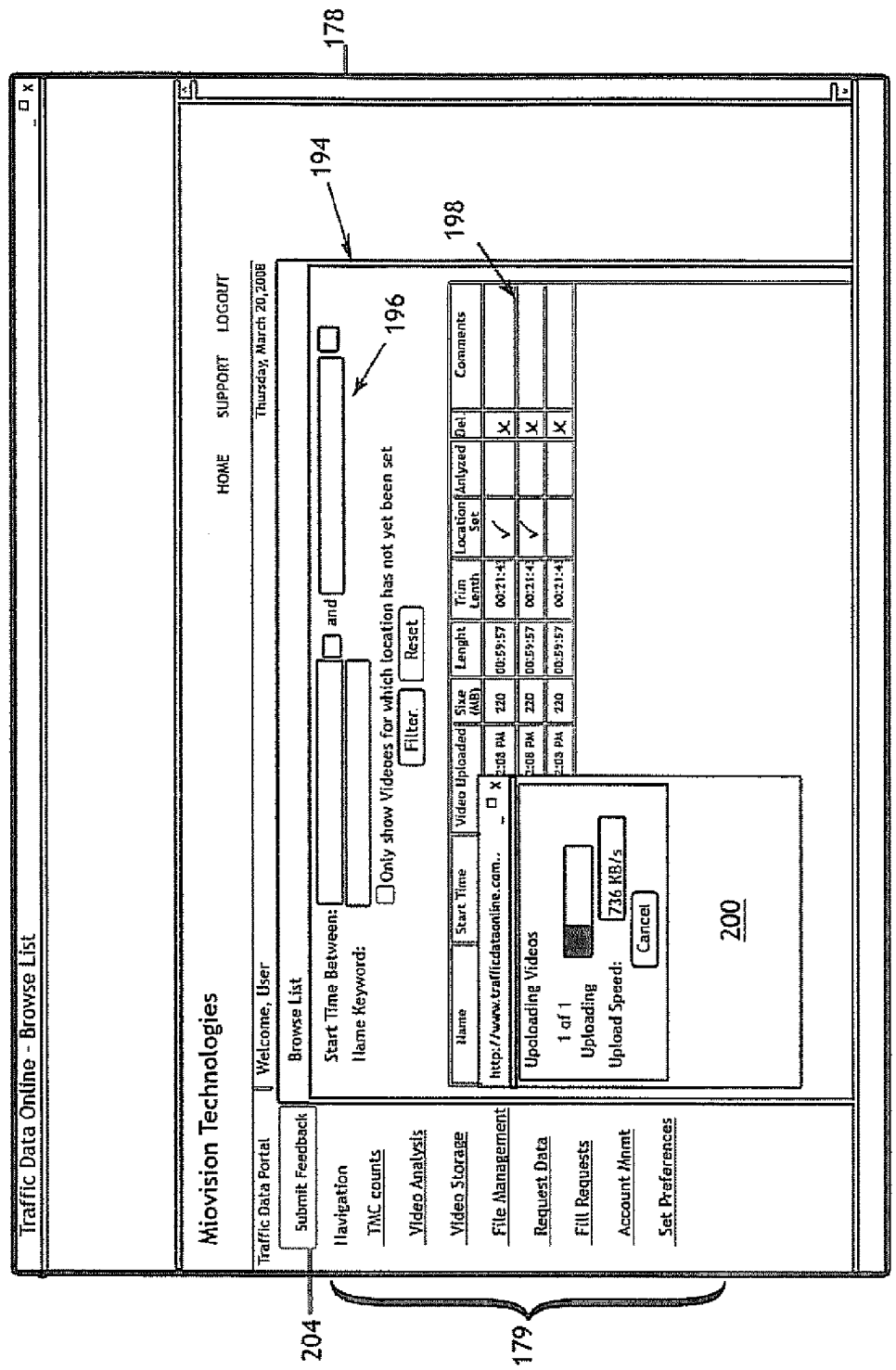
FIG. 14 is a screen shot showing a video upload in progress.

FIG. 14 illustrates an upload screen 194 that is displayed upon initiating a download. As discussed above, in this traffic example, the video file 24 is stored in one or more manageable chunks. These chunks may be listed in a browser 198 that also enables the user to select other parameters for the video analysis 42. In this example, a start time and a finish time can be specified as well as a name or keywords to identify the video file 24. The user may then initiate a download by selecting an appropriate button in the browser 198 (not shown), which launches a status box 200 that shows the progress of the upload to the user, as discussed above. FIG. 14 also illustrates an optional feedback tool 204 for enabling the user to engage the intermediary server 132 or web server 134 by way of written or survey type feedback.

FIG. 14 also illustrates several options available from the toolbar 179. A TMC Counts option may be selected, which in this example provides an Add New Counts feature, a Merge Counts feature and a Search Map features. The Add New Counts option allows the user to add turning movement counts from devices such as a manual turning movement count board, available from, e.g. JAMAR™ or Gretch™. The Merge Counts option allows the user to merge two different counts together. For example, if two people manually counted the same intersection (one person counts two approaches while the other counts the other two approaches), it would allow them to merge the data they collected back together into one report for one intersection. The Search Map option allows a user to see their data (e.g. collected traffic data) on a map. A Video Analysis option is also shown, which allows a user to upload a video file 24, which may first launch the parameter settings tool 180 shown in FIG. 13 and then the box 200 shown in FIG. 14. Also shown is a Video Storage option, which shows where video files 24 are on a file mapping and allows a user to playback the video content that they have collected. A File Management option can be used to upload files such as completed reports, images etc. that are associated with a particular intersection or study. The files can be placed in a map so that they can be more easily located. A Request Data option can be provided to allow a user to request data from a third party entity such as a traffic data collection firm (e.g. see the business relationship illustrated in FIG. 19(a)). A Fill Requests option allows a traffic data collection firm (i.e. the third party entity mentioned above) to fill a request for data with a traffic count. An Account Management option allows the user to set account preferences such as the number of users, the permissions, organizational information such as the address, logo, etc. and to handle billing procedures. A Set Preferences option is also shown, which allows the user to set preferences such as fonts, wordings and default comments.

Figure 15:
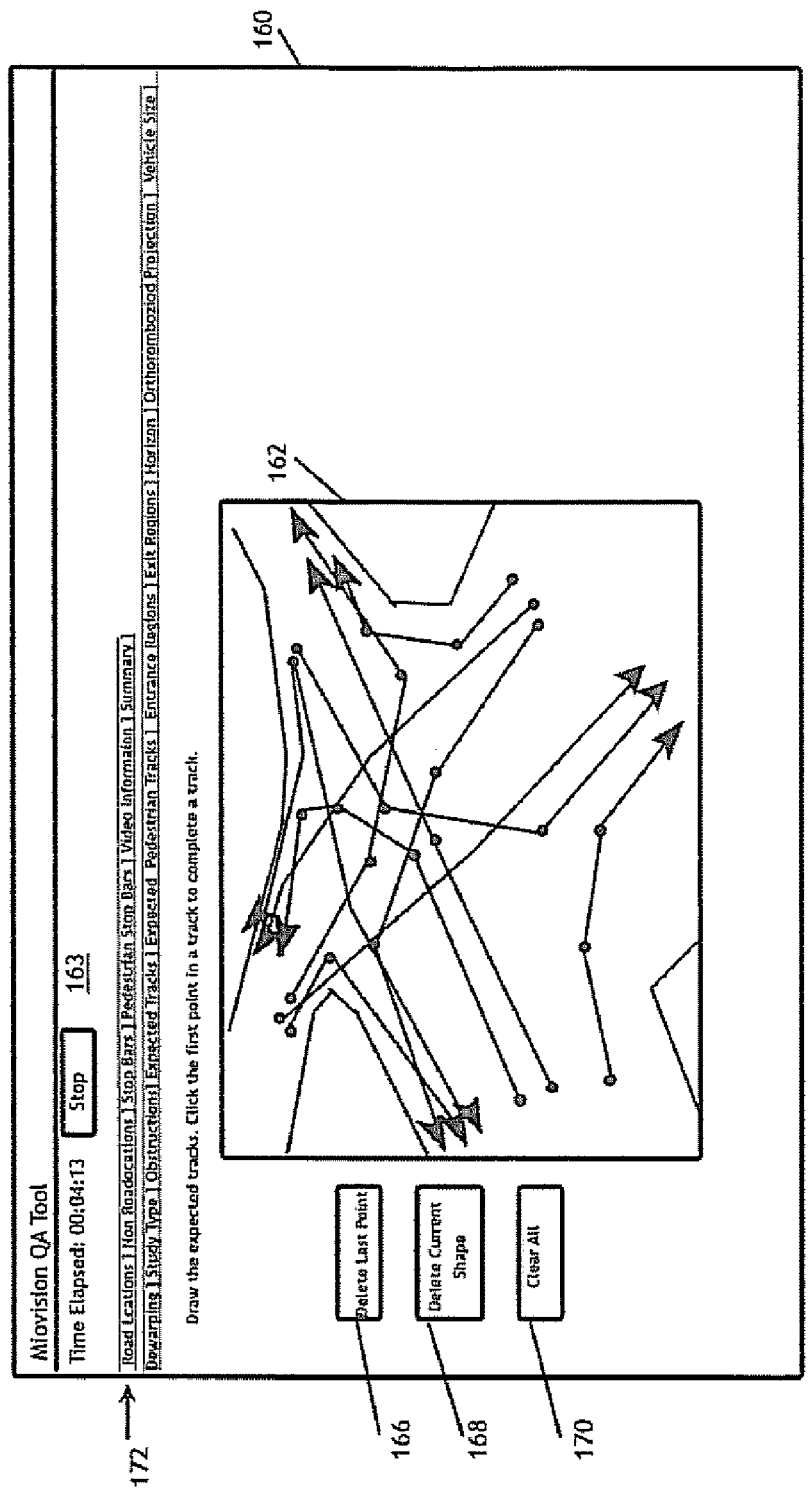
FIG. 15 is a screen shot showing a configuration tool for configuring video content prior to being analyzed.

As noted above, the configuration entities 142 may use a configuration tool 150 to perform the configuration stage 56. An example of a configuration API 160 for the configuration tool 150 is shown in FIG. 15. The API 160 includes a display screen 162 for viewing a representative frame or frames 107 (typically several frames) from the video content and a number of options for a corresponding one of the configuration options 172, which in this example are presented in a tabular form. A timer option 163 may also be used to track the amount of time taken for completing the configuration process. There are several options in the configuration tool 150 for identifying expected characteristics. FIG. 15 illustrates a display screen 162 for an Expected tracks option. The Expected Tracks option allows the user to define any track that an object moving through the image is likely to take by selecting points on the screen that when connected define a track. In the traffic example, this may include a track showing how a vehicle moves through an intersection. i.e. for turning, driving through etc. As discussed above, the expected tracks would be used by the track matching module 112 for matching with observed tracks identified during the video analysis stage 42. In the example shown in FIG. 15, the Expected Tracks option may include a Delete Last Point button 166 for deleting the last point selected by the user, a Delete Current Shape button 168 to delete the entire shape currently being drawn, and a Clear All button 170 to clear all tracks if the user wishes to begin again. It will be appreciated that the options shown in FIG. 15 are for illustrative purposes only and various other options can be provided to suit a particular application.

In this example, an Expected Pedestrian Tracks option is also provided, which enables the user to separately define tracks that a pedestrian is likely to take. Again, if part of the study, the expected pedestrian tracks would be used by the track matching module 112 during the video analysis stage 42 to match with observed tracks.

The other configuration options 172 will now be described. The Dewarping option modifies an image taken from the video to account for camera barrel distortion, which is a curving of the straight lines in the video. Of course, if barrel distortion is not an issue, use of this option is not required. This allows the user, when configuring the video, to see an undistorted image. As discussed above, the dewarping parameters are also used, when applicable, during the video analysis 42. A Study Type option is also provided, which allows the user to select which type of study pertains to the video file 24. In the traffic example, the study may be for an intersection, a roundabout, a highway etc. The Study Type option can also enable the user to configure the relative speed/motion of objects in the video, such as vehicles. This can be done using any suitable technique for determining motion, including estimations based on the location of the scene. An Obstructions option enables the user to identify objects in the video that may obstruct the view of other objects that are of interest. In the traffic example, a light post blocking the view of vehicles moving through an intersection would be considered an obstruction and identified accordingly.

To assist the video analysis stage 42 in determining where to look for the emergence of new object, an Entrance Regions option can be used. The user may select areas in the observed scene (e.g. intersection) where a new object will first be observed. It can be appreciated that the entrance regions indicate a start point for a track. An Exit Regions option may also be used to similarly define where objects will likely disappear. This also assists the video analysis stage 42 in narrowing down where it should look for the endpoint of a track.

A Horizon Line option is also shown in FIG. 15, which simply allows the user to define the horizon as seen in the video. This information is used to understand the relative angle between the road plane and the camera 20. A Vehicle Size option is provided that allows the user to identify the relative sizes of vehicles. In other examples, this may generally be referred to as an object size option. This information is used to determine what is an object of interest version what is not an object of interest. For example, a bird flying past the camera 20, which may appear to be going along an expected track, would not likely be included in the study and thus can be disregarded. To further define and narrow down the areas where a track can and cannot occur, a Road Location option and a Non-Road Location option are used. The Road Location option simply identifies where the road is in the video while the Non-Road Location option identifies portions of the scene that are not part of the road. The non-road locations are used for image stability so that the video analysis stage 42 can utilize straight lines or other features that it can lock onto in order to stabilize the image, e.g. for the registration module 104. It may be noted that in a non-traffic example, the road and non-road locations would be similar areas in which movement or detected events can occur and cannot occur respectively.

Tripwires may also be used to identify where object tracks enter and exit an intersection. This data allows the data analysis module 52 to determine the specific movement of the vehicles for generating results from the extracted data 49. Similarly, Pedestrian Tripwires indicate where pedestrians enter and exit the scene. In the traffic example, The Stop Bars and Pedestrian Stop Bars options are particular forms of "tripwires" that are used for similar purposes.

The configuration parameters and settings that result from the configuration process 56, using for example the configuration tool API 160 in FIG. 15 are, in one example, stored in an XML file and uploaded to the configuration settings module 44, e.g. at the storage node 140. The video analysis module 42 is configured to read in the XML file and use the configuration settings 44 to process and analyze the video file 24 as discussed above.

Figure 16:
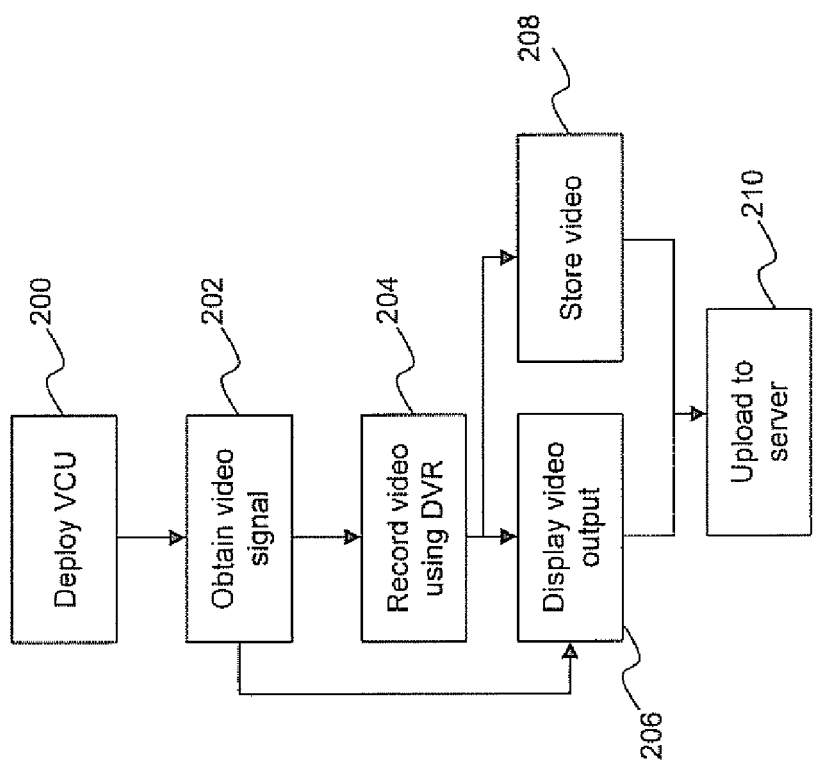
FIG. 16 is a flow chart illustrating operations performed in obtaining video content.

An example of the entire video collection, upload and analysis process will now be described. Turing first to FIG. 16, a process for obtaining the video and uploading it to the server 14 is shown. The client 12 deploys the VCU 70 at 200 to position and elevate the camera 20 to capture the appropriate scene. It will be understood that in some configurations, the camera(s) 20 is/are already in a fixed location, in which case step 200 would comprise connecting an electronics box 78 or similar device to the existing infrastructure. As such, it will be appreciated that the example provided herein is for illustrative purposes only and certain ones of the operations may be omitted or modified and other added where necessary to achieve the overall objectives described in detail above. Once the VCU 70 has been deployed, the electronics box 78 obtains the video signal 94 from the camera 20 at 202 and the DVR 84 records a new video clip at 204. The video signal 94 may also be viewed on the display 86 at 206, before, during and subsequent to recording. The recorded video clip may also be displayed at 206 and would be stored in the memory 26 at 208. Once the necessary video files 24 (one or more) have been acquired, they may be uploaded to the server 14 at 210. The upload step 210 may be performed at any time subsequent to the recording process 204 or may be done in real time (e.g. in a streaming video). For the purpose of this example, it will be assumed that the video files 24 are uploaded by the client 12 on an individual and file-by file basis.

Figure 17:
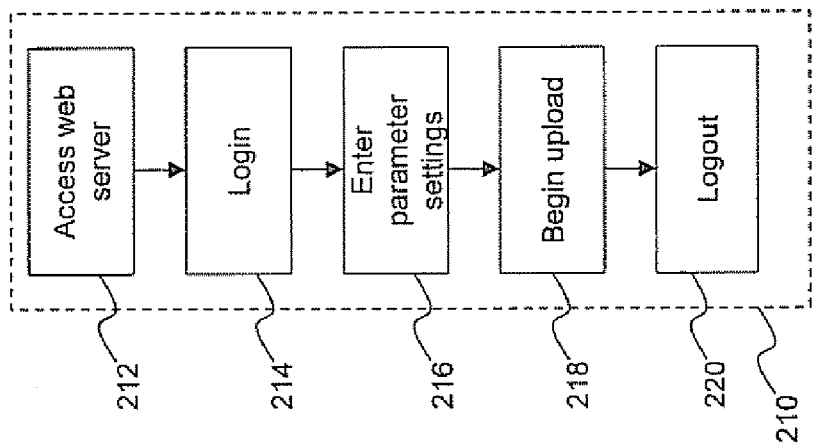
FIG. 17 is a flow chart illustrating further detail of the upload operation shown in FIG. 15.

Turning now to FIG. 17, steps taken for performing the upload stage 210 are shown in greater detail. In this example, a user would access the web server at 212 and login 214 to access their account and profile. Any required parameter settings would then be entered at 216, e.g. to indicate North, specify the length, start and end points of the study, the type of study and what to look for etc. The user then initiates the upload at 218. As noted above, the upload process 210 involves connecting the client 12 directly to an appropriate one of the storage nodes 140 in the DCS 130, e.g. using an ActiveX control. Once the upload is complete, or after all uploads have been completed, the user may then logout at 220.

Figure 18:
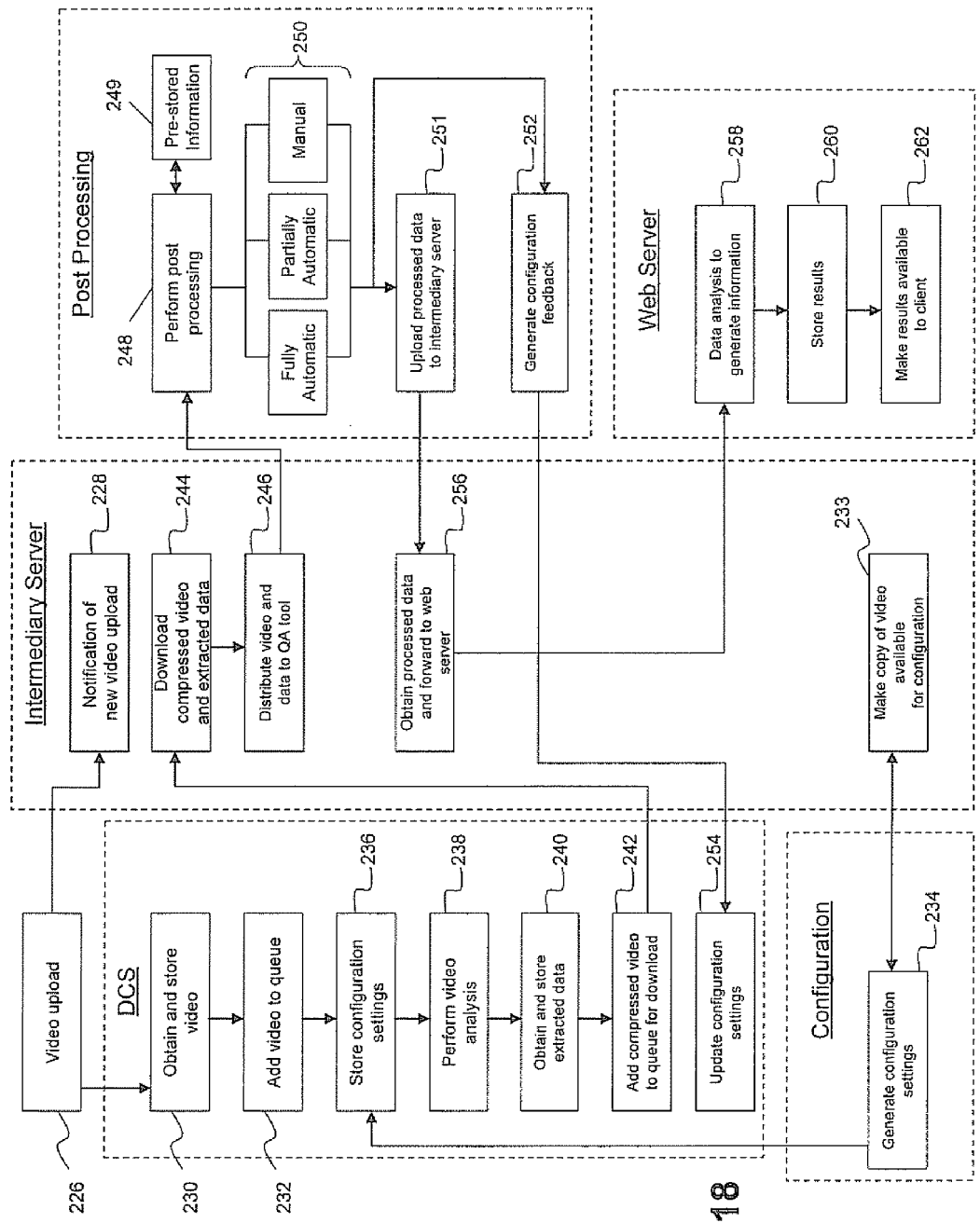
FIG. 18 is a flow chart illustrating operations performed during a video analysis procedure.

FIG. 18 illustrates steps performed at the server 14, in this example using the various server devices or entities shown in FIG. 11. Each video file 24 that is uploaded to the DCS 130 at 226 is stored in a video storage module 38 at 230 and added to the video queue 40 at 232. For each new upload at 226, a notification is provided to the intermediary server 132 at 228 so that the intermediary server 134 can coordinate the configuration and analysis of new incoming video as well as schedule and collect revenue, initiate billing etc. Wile the video file 24 is in the video queue 40 waiting to be analyzed, it is configured by an administrator 142 at 234 to generate the parameters and configuration settings 44 to be used by the video analysis module 42. As shown, in order to configure the video file 24, the configuration entity 142 first accesses the frame(s) 24' that have been made available by the intermediary server 132 at 233.

The configuration settings are then stored at 236, in preparation for the video analysis stage 42, which is performed at one of the processing nodes 141. Copies of the video file 24, and configuration settings 44 are then transferred to an available processing node 141 and the video analysis 42 is performed at 238. The extracted data 49 generated determining the video analysis stage 42 is then transferred back to the storage node 140 to await post processing 50. The compressed or downsampled video 24" is either generated at this time or an already generated version obtained from the video compression module 48. The data storage module 46 stores the extracted data 49 associated with the video file 24 at 240 until it is downloaded for the post processing entity 144. The compressed video 24" is added to a queue at 242 until the download occurs.

The intermediary server 136 uses the synchronization module 133 to schedule and coordinate a download to the post processing entity 144. The intermediary server 136 downloads the compressed video file 24" and extracted data 49 at 244 and distributes them to an available one of the post processing devices 146 at 246. Using the QA tool 148, the post processing stage 50 is performed at 248. As discussed, the post processing 50 may involve different processing streams, for example a fully automatic stream, or a partially automatic stream. One of the streams is selected using the pre-stored information examined at 249 and then performed at 250. The post processing stage 50, as discussed above, reviews the extracted data 49 with respect to what is actually seen in the video to verify the integrity of the video analysis stage 42, and makes corrections to any errors, if found, thus producing, if necessary, a set of modified extracted data 49'. During the post processing stage 50, feedback for the configuration settings 44 may be generated at 252, e.g. according to observations made with regards to the corrections that were required. If such configuration feedback is venerated at 252, the post processing device 146 would send a feedback response to the DCS 130 so that the configuration settings 44 can be modified. It will be appreciated that the intermediary server 132 may require the feedback to be channeled through it to control and verify any changes to the configuration settings 44 or the feedback can be sent using some other channel.

Once the appropriate stream of the post processing stage 50 has been completed at 250, the extracted data 49 (or modified extracted data 49') is then uploaded to the intermediary server at 251 where the synchronization module 133 obtains the data 49 at 256 and redirects it to the web server 134, who then processes the extracted data 49 to obtain information which in an appropriate format for reporting at 258 and the results are stored at 260 so that they may be made available to the client 12 at 262.

Figure 19C:
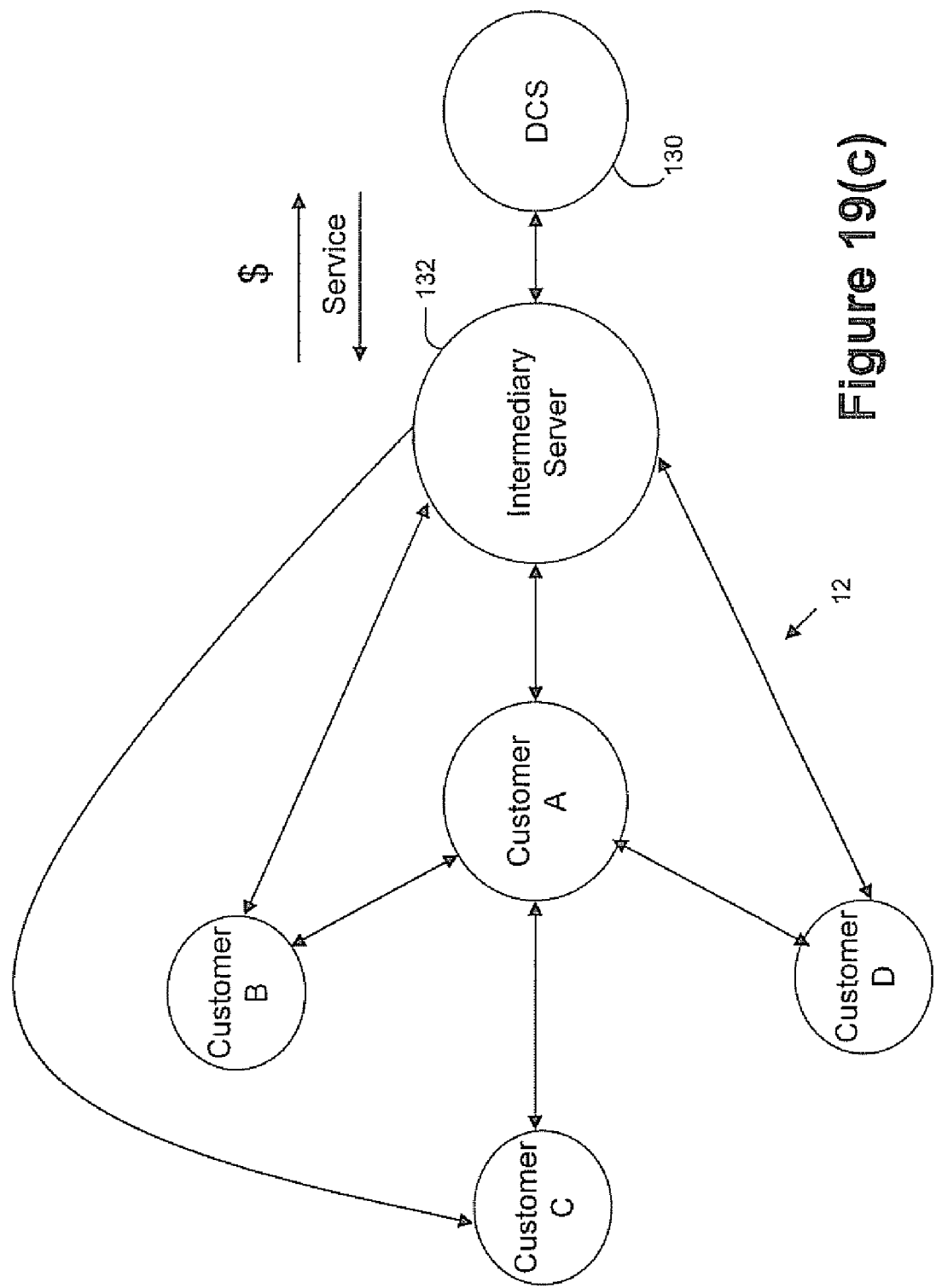

It has been discussed above that the intermediary server 132 in one aspect, can be used to control, monitor and administer the distribution and outsourcing of tasks while monitoring incoming and outgoing costs related to the video analysis service conducted by the server devices on behalf of the client 12. As noted above, the configurations described herein are particularly suitable for offloading responsibility from the client 12 so that dedicated equipment and staff are not needed in order for a client to obtain a sophisticated analysis of video content. Turning now to FIG. 19(a) a first business relationship between the intermediary server 132, a customer (representing a client 12) and outsourced services such as the DCS 130 is shown. In this example, Customer A has a series of its own customers, namely Customers B, C and D who request that video data be collected. Customer A, rather than collecting this data manually, can collect video files 24 and upload them to the server 14, e.g. through the web server 134, which is monitored by the intermediary server 132. As discussed above, the intermediary server 132 and web server 134 in some examples may be the same entity and only the intermediary server 132 is shown in FIGS. 19(a) to 19(c) to illustrate the business relationship rather than the architecture for uploading etc. In this case, the intermediary server 132 facilitates the provision of service to Customer A while collecting a service fee that is higher than the cost of performing the service. It can be seen that the intermediary server 132 utilizes the DCS 130 to outsource the storage and processing tasks, which involves a service being, provided to the intermediary server 132 (on behalf of Customer A) in exchange for a lesser service fee such that the intermediary server 132 is able to obtain revenue for monitoring the process. A similar exchange of service and fees may be made between the intermediary server 132 and any other entities participating in the overall process, such as post processing entities 144 and configuration entities 142. The net result however, is to obtain the end service for the client 12 at a cost that is lower than the revenue which is obtained from the customer. As part of the service, access to the web application 174 may be controlled so that Customer A and Customers B, C and D all have access or only certain ones.

FIG. 19(*b*) illustrates another business relationship, wherein Customer X obtains and uploads the video content to the intermediary server 132, which is done for Customer X only and not on behalf of other customers. In some cases, Customer X could be one of Customers B, C or D described above. FIG. 19(*c*) illustrates a business relationship similar to FIG. 19(*a*) however the end customers, i.e. Customers B, C and D also interact with the intermediary server 132 to obtain additional services or tools that Customer A cannot provide. This may include additional data analysis tool, other data collection services, equipment, data storage etc. In this example, the intermediary server 132 has two incoming streams of revenue that are divided amongst the entities requesting the services.

Figure 20C:
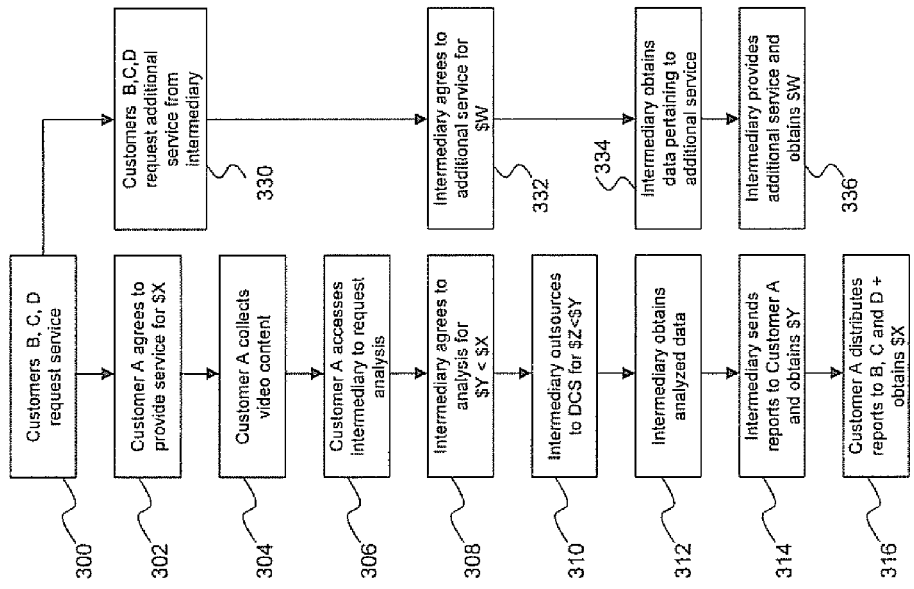
FIGS. 20(a) to 20(c) are flow charts showing steps taken exchanging services for service fees in respective relationships shown in FIGS. 19(a) to 19(c).
Figure 20B:
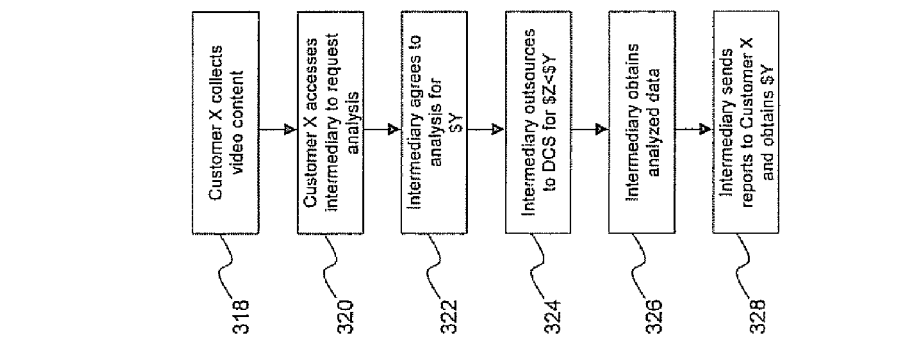
Figure 20A:
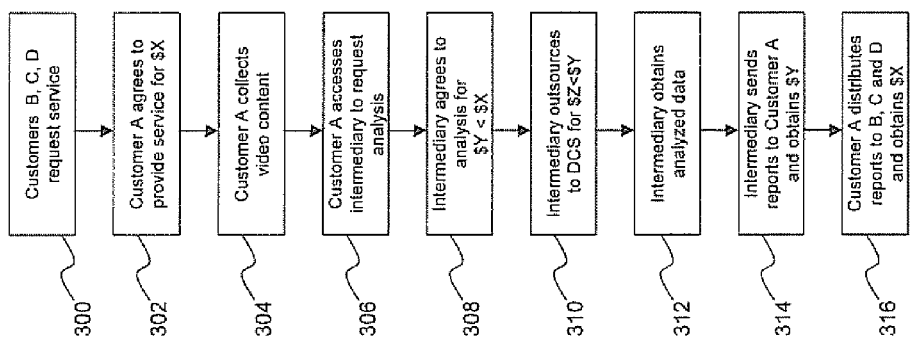

FIGS. 20(*a*) through 20(*c*) illustrate a typical exchange of service and money for the respective relationships shown in FIGS. 19(*a*) through 19(*c*). In FIG. 20(*a*), at 300 Customers B, C and D request services through Customer A. Customer A agrees to provide the service to Customers B, C and D at 302 for $X. Customer A then collects the video content at 304 and accesses the intermediary server 132, e.g. through the web server 134 at 306 to request that a video analysis be performed on the video content. At 308 the intermediary server 132 agrees to provide the analysis for $Y, which should be less than $X in order for Customer A to profit from receiving $X from Customers B, C and D. The intermediary server 132 then outsources all or some of the service to the DCS 130 at 310 for $Z, which should be less than $Y in order for the intermediary server 132 to profit from receiving $Y from Customer A. The information or data pertaining to the service is then obtained by the intermediary server 132 at 312 and is made available, e.g. in a report to Customer A at 314 at which time the intermediary server 132 receives $Y. At 316, Customer A may then distribute reports or other data pertaining to the agreed upon service and obtain $X from Customers B, C and D.

In FIG. 20(*b*), Customer A collects the video content at 318 and then accesses the intermediary server 132 at 320 as above, however, in this relationship, there is no obligation to other customers. The intermediary server 132 agrees to provide the requested service for $Y at 322 and as before, outsources to the DCS 130 for $Z, which is less than $Y at 324. The intermediary server 132 then obtains the analyzed data at 326 and exchanges this data, e.g. in a report, to Customer X for the agreed upon $Y.

In FIG. 20(*c*), it can be seen that 300-316 are identical to FIG. 20(*a*) and thus details thereof need not be reiterated. However, a parallel stream of revenue for the intermediary server 132 is collected directly from Customers B, C and D. At 330, Customers B, C and D, who would have access to the intermediary server 132, e.g. through the web server 134, would request the additional service. At 332, the intermediary server 132 would agree to the requested additional service for $W. The intermediary server 132 would then obtain data pertaining to the additional service at 334, or obtain software tools, equipment etc. per the agreement and then provide these to Customers B, C and D and obtain $W. Although not shown in FIG. 20(*c*), the additional service may comprise outsourcing, in which case the intermediary server 132 would arrange to obtain the additional service for a cost that is lower than $W.

It can therefore be seen that by moving the processing, e.g., computer vision, to a remote one or more server devices 14, many clients 12 can employ the capabilities offered by the server 14 without requiring dedicated equipment. In this way, the clients 12 can use the server's capabilities as much and as often as necessary which can lead to significant cost savings and efficiencies. Moreover, updates and improvements to the processing analytics can be centrally implemented which avoids having to update each site or location. The clients 12 can use web-based portals provided by the server 14 or can directly stream to the server 14 and obtain feedback through other channels. Accordingly, a flexible and scalable solution is provided that can be external and service based for small users or locally operated for larger solutions.

It will be appreciated that the above principles may be applied to any multimedia content and that various configurations may be employed for specific applications. As such, the examples provided herein are for illustrative purposes only.

Although the invention has been described with reference to certain specific embodiments, various modifications thereof will be apparent to those skilled in the art without departing from the spirit and scope of the invention as outlined in the claims appended hereto.

The invention claimed is:

1. A method for analyzing multimedia data comprising:
a server device receiving a multimedia file generated by a remotely located multimedia client device operated for another entity, said server device comprising configuration capabilities specifying how the received multimedia file can be analyzed;
said server device providing details of said configuration capabilities to said other entity using an interface;
said server device receiving from said other entity, a request to analyze said multimedia file;
said server device receiving from said other entity, at least one input specifying at least one of said configuration capabilities and, if necessary, additional configuration capabilities required to analyze said multimedia file in accordance with said request;
said server device using said at least one input to generate configuration settings which are specific to said multimedia file, said configuration settings reflecting said at least one input and being indicative of how to analyze objects captured by said multimedia file in order to extract desired information about particular ones of said objects for said other entity;
said server device having at least a portion of said multimedia file loaded and said particular ones of said objects analyzed according to said configuration settings to extract said desired information therefrom on behalf of said other entity;
said server device obtaining extracted information resulting from analysis of said particular objects using said configuration settings; and
said server device making said extracted information available to said other entity to complete said request.

2. The method according to claim 1 further comprising said server device reviewing said extracted information with respect to said multimedia file to verify correctness of said analysis and modifying said extracted information if one or more errors are found.

3. The method according to claim 2 wherein said reviewing is performed at one or more post processing sites, a copy of said multimedia file and said extracted information being provided to said post processing sites following said analysis.

4. The method according to claim 2 wherein said reviewing comprises identifying additional configuration settings or modifications of existing configuration settings and providing configuration feedback for adjusting said configuration settings for refining said analysis of said multimedia file.

5. The method according to claim 1 wherein said multimedia file comprises video content and said analysis comprises performing computer vision techniques to identify, classify and track objects identified in said video content.

6. The method according to claim 5 wherein said video content is received as a stream of compressed data from said client device and said method comprises decompressing said compressed data as it is received.

7. The method according to claim 1 wherein said receiving is initiated through an intermediary server over a network, said intermediary server communicating with said client device to redirect said multimedia file to one or more storage devices.

8. The method according to claim 1 wherein said server device utilizes a distributed computing system comprising one or more processing nodes for performing said analysis and one or more storage nodes for storing said multimedia file and said configuration settings, said processing nodes obtaining a copy of said multimedia file and a copy of said configuration settings from said storage nodes prior to said analysis.

9. The method according to claim 8 wherein said multimedia file is redirected by an intermediary server accessed by said client device directly to said storage nodes, said intermediary server having copies of said multimedia file and said configuration settings downloaded to said processing nodes for said analysis and being responsible for redirecting copies of said multimedia file and said extracted information to one or more post processing sites for reviewing said extracted information for correctness.

10. The method according to claim 1 wherein said configuration settings are generated at one or more configuration sites, said configuration sites accessing said multimedia file prior to said analysis and utilizing a configuration tool adapted to provide a plurality of options for defining attributes associated with selected portions of said multimedia file for extracting said extracted information.

11. A system for analyzing multimedia content comprising:
at least one server entity connected to one or more remote client devices over a network, said at least one server entity comprising one or more hardware processors being operable to:
receive a multimedia file generated by a remotely located multimedia client device operated for another entity, said at least one server entity comprising configuration capabilities specifying how the received multimedia file can be analyzed;
provide details of said configuration capabilities to said other entity using an interface;
receive from said other entity, a request to analyze said multimedia file;
receive from said other entity, at least one input specifying at least one of said configuration capabilities and, if necessary, additional configuration capabilities required to analyze said multimedia file in accordance with said request;
use said at least one input to generate configuration settings which are specific to said multimedia file, said configuration settings reflecting said at least one input and being indicative of how to analyze objects captured by said multimedia file in order to extract desired information about particular ones of said objects for said other entity;
have at least a portion of said multimedia file loaded and said particular ones of said objects analyzed according to said configuration settings to extract said desired information therefrom on behalf of said other entity;
obtain extracted information resulting from analysis of said particular objects using said configuration settings; and
make said extracted information available to said other entity to complete said request.

12. The system according to claim 11, said one or more processors being further operable to: review said extracted information to verify correctness of said analysis and; correct said extracted information if one or more errors are found.

13. The system according to claim 12, said at least one server entity comprising one or more post processing sites, wherein said extracted information is reviewed at said one or more post processing sites, a copy of said multimedia file and said extracted information being provided to said post processing sites following said analysis.

14. The system according to claim 12 wherein said extracted information is reviewed by identifying additional configuration settings or modifications of existing configuration settings and providing configuration feedback for adjusting said configuration settings for refining analysis of related multimedia file.

15. The system according to claim 11 wherein said multimedia file comprises video content and said analysis comprises performing computer vision techniques to identify, classify and track objects identified in said video content.

16. The system according to claim 15 wherein said video content is received as a stream of compressed data from said client device and one of said at least one server entity is configured for decompressing said compressed data as it is received.

17. The system according to claim 11, said at least one server entity comprising an intermediary server connected to said client device over a network, wherein receipt of said multimedia file is initiated through said intermediary server, said intermediary server communicating with said client device to redirect said multimedia file to one or more storage devices.

18. The system according to claim 11, said at least one server entity utilizing a distributed computing system comprising one or more processing nodes for performing said analysis and one or more storage nodes for storing said multimedia file and said configuration settings, said processing nodes configured for obtaining a copy of said multimedia file and a copy of said configuration settings from said storage nodes prior to said analysis.

19. The system according to claim 18, said at least one server entity comprising an intermediary server accessed by said client device, wherein said multimedia file is redirected by said intermediary server directly to said storage nodes, said intermediary server having copies of said multimedia file and said configuration settings downloaded to said processing nodes for said analysis and being responsible for redirecting copies of said multimedia file and said extracted information to one or more post processing sites for reviewing said extracted information for correctness.

20. The system according to claim 11, said at least one server entity comprising one or more configuration sites, wherein said configuration settings are generated at said one or more configuration sites, said configuration sites configured for accessing said multimedia file prior to said analysis and utilizing a configuration tool adapted to provide a plurality of options for defining attributes associated with selected portions of said multimedia file for extracting said extracted information.

* * * * *